(12) United States Patent
Kato et al.

(10) Patent No.: US 10,320,310 B2
(45) Date of Patent: Jun. 11, 2019

(54) POWER CONVERSION DEVICE

(71) Applicant: Mitsubishi Electric Corporation, Chiyoda-ku (JP)

(72) Inventors: Takahiro Kato, Chiyoda-ku (JP); Kikuo Izumi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 336 days.

(21) Appl. No.: 15/316,944

(22) PCT Filed: Jun. 24, 2014

(86) PCT No.: PCT/JP2014/066655
§ 371 (c)(1),
(2) Date: Dec. 7, 2016

(87) PCT Pub. No.: WO2015/198391
PCT Pub. Date: Dec. 30, 2015

(65) Prior Publication Data
US 2017/0117821 A1    Apr. 27, 2017

(51) Int. Cl.
*H02M 1/08* (2006.01)
*H02M 7/537* (2006.01)
(Continued)

(52) U.S. Cl.
CPC ............. *H02M 7/537* (2013.01); *H02M 1/08* (2013.01); *H02M 1/12* (2013.01); *H02M 1/38* (2013.01);
(Continued)

(58) Field of Classification Search
CPC ..... H02M 7/53871; H02M 2001/0048; H02M 1/088; H02M 1/38; H02M 2001/385
See application file for complete search history.

(56) References Cited

U.S. PATENT DOCUMENTS

2011/0204859 A1*  8/2011  Prodic ................. H02M 3/1588
323/271

FOREIGN PATENT DOCUMENTS

JP      3-45165 A    2/1991
JP      6-62580 A    3/1994
(Continued)

OTHER PUBLICATIONS

International Search Report dated Sep. 16, 2014 in PCT/JP2014/066655 filed Jun. 24, 2014.

*Primary Examiner* — Jue Zhang
*Assistant Examiner* — Lorena D Bruner
(74) *Attorney, Agent, or Firm* — Oblon, McClelland, Maier & Neustadt, L.L.P.

(57) ABSTRACT

A power conversion device includes: a power conversion unit composed of a power conversion circuit having switching elements, an output current measurement unit, an output voltage measurement unit, and reactor; a voltage command generating unit for generating a voltage command; a dead time correction unit for calculating a dead time correction amount for correcting voltage error, between the voltage command and output voltage, caused due to dead time; and a PWM signal generating unit for generating switching signals according to the voltage command and the dead time correction amount, wherein the dead time correction unit calculates the dead time correction amount from the voltage command, the measured output voltage, and the measured output current.

18 Claims, 24 Drawing Sheets

(51) Int. Cl.
*H02M 1/12* (2006.01)
*H02M 1/38* (2007.01)
*H02M 7/5387* (2007.01)
*H02M 1/00* (2006.01)

(52) U.S. Cl.
CPC .......... *H02M 7/53871* (2013.01); *H02M 2001/0009* (2013.01); *H02M 2001/385* (2013.01)

(56) References Cited

FOREIGN PATENT DOCUMENTS

| | | |
|---|---:|---|
| JP | 9-9645 A | 1/1997 |
| JP | 2000-156983 A | 6/2000 |
| JP | 2002-95262 A | 3/2002 |
| JP | 2003-250276 A | 9/2003 |
| JP | 2010-88266 A | 4/2010 |
| JP | 5257594 B2 | 8/2013 |

* cited by examiner (a)

(b)

POWER CONVERSION DEVICE

TECHNICAL FIELD

The present invention relates to a power conversion device having a dead time correction function to eliminate error voltage, between a voltage command and output voltage, caused due to dead time.

BACKGROUND ART

In a power conversion device, dead time in which switching signals for upper and lower arms are turned off is provided to prevent short-circuit between the upper and lower arms. In the dead time, output voltage changes in accordance with the polarity of output current, whereby error voltage occurs between a voltage command and the output voltage. Thus, predetermined output voltage cannot be obtained.

In order to solve this problem, a method of adding a dead time correction amount to the voltage command in accordance with the polarity of the output current is known. However, due to a harmonic component and the like contained in the output current, there is a problem that the correction direction oscillates in the vicinity of zero cross of the output current.

In order to solve this problem, a method of specifying an output current waveform function not containing a harmonic component and the like is disclosed (for example, Patent Document 1). In this method, an output current waveform function that corresponds to an ideal output current waveform not containing a harmonic component and the like and that has an undefined coefficient value, is used, and the coefficient of this function is sequentially updated until least-squares error between a current value calculated from this function and an actual output current value is minimized.

CITATION LIST

Patent Document

Patent Document 1: Japanese Patent No. 5257594

SUMMARY OF THE INVENTION

Problems to be Solved by the Invention

However, in the conventional invention, since it takes some time to specify the output current waveform function, there is a problem that the dead time correction cannot immediately follow variation in the output current due to change in power consumption of a load, or the like.

In addition, if the dead time correction is not properly performed, there is a possibility the output voltage becomes overvoltage and the output current becomes overcurrent. In order to suppress such overcurrent, it is necessary to provide a large reactor at the output part of the power conversion device.

Home electric appliances such as a cleaner and an air-conditioner are capacitor-input loads, and their current waveforms are not a sinewave but a nonlinear waveform in which a conduction period and a non-conduction period arise on a rectification element of the load in one cycle of the output voltage. In order to specify such an output current waveform function, it is necessary to prepare an output current waveform function of the nonlinear load, and thus it takes a longer time to specify the output current waveform function.

Further, in the case where the power conversion device, the capacitor-input load, and a distributed power supply such as photovoltaic generation are interconnected, in one cycle of the output voltage, charge operation and discharge operation of the power conversion device are switched alternately and zero cross of the output current arises a plurality of times.

In such a case, in the conventional method of calculating the dead time correction amount by specifying the output current waveform function, it is necessary to determine the output current waveform function, also considering that zero cross of the output current might arise a plurality of times.

In addition, in autonomous operation in which the power conversion device operates without being interconnected with a power grid, in the case where a distributed power supply having an isolated operation detection unit, and the power conversion device operate in an interconnected manner, due to the dead time, the frequency changes in the vicinity of zero cross of the output voltage, whereby the distributed power supply might detect isolated operation.

The present invention has been made to solve the above problem, and an object of the present invention is to provide a power conversion device capable of instantaneously calculating the dead time correction amount.

Solution to the Problems

A power conversion device according to the present invention includes: a power conversion unit including: a power conversion circuit which has a switching element and converts DC power to AC power; an output current measurement unit for measuring output current of the power conversion circuit; an output voltage measurement unit for measuring output voltage of the power conversion circuit; and a reactor which is connected to an output side of the power conversion circuit and suppresses a harmonic; and a control unit including: a voltage command generating unit for generating a voltage command for controlling the switching element; a dead time correction unit for calculating a dead time correction amount for correcting voltage error, between the voltage command and the output voltage, caused due to dead time for preventing short-circuit of the switching element; an addition unit for adding the dead time correction amount to the voltage command; and a PWM signal generating unit for generating a switching signal according to output of the addition unit, wherein the dead time correction unit calculates the dead time correction amount from the voltage command, measured output voltage measured by the output voltage measurement unit, and measured output current measured by the output current measurement unit.

Effect of the Invention

In the power conversion device according to the present invention, the dead time correction unit calculates the dead time correction amount from the voltage command, the measured output voltage measured by the output voltage measurement unit, and the measured output current measured by the output current measurement unit. Therefore, the dead time correction amount can be instantaneously calculated even in the case where the output current changes due to load change or the like or in the case where the load has nonlinear characteristics. In addition, in the case of performing operation interconnected with the distributed power supply, in the autonomous operation, the distributed power supply can be prevented from erroneously detecting isolated operation on the basis of frequency change due to the dead time.

DESCRIPTION OF EMBODIMENTS

Embodiment 1

Embodiment 1 relates to a power conversion device that calculates a zero current cross time of output current using estimated reactor voltage and calculates a dead time correction amount from the zero current cross time of the output current.

Hereinafter, the configuration and operation of a power conversion device 1 according to embodiment 1 of the present invention will be described with reference to FIG. 1 which is a system configuration diagram including the power conversion device, FIG. 2 which is a block diagram of a PWM signal generating unit, FIG. 3 which is a switching signal waveform diagram, FIG. 4 which shows an output voltage waveform and an output current waveform in a dead time period, FIG. 5 and FIG. 6 which illustrate waveforms in a zero current cross time, FIG. 7 to FIG. 9 which illustrate change in output current during the dead time period, FIG. 10 and FIG. 11 which are flowcharts for calculating a dead time correction amount, FIG. 12 which is a control flowchart, and FIG. 13 which illustrates the effect of dead time correction.

Figure 1:
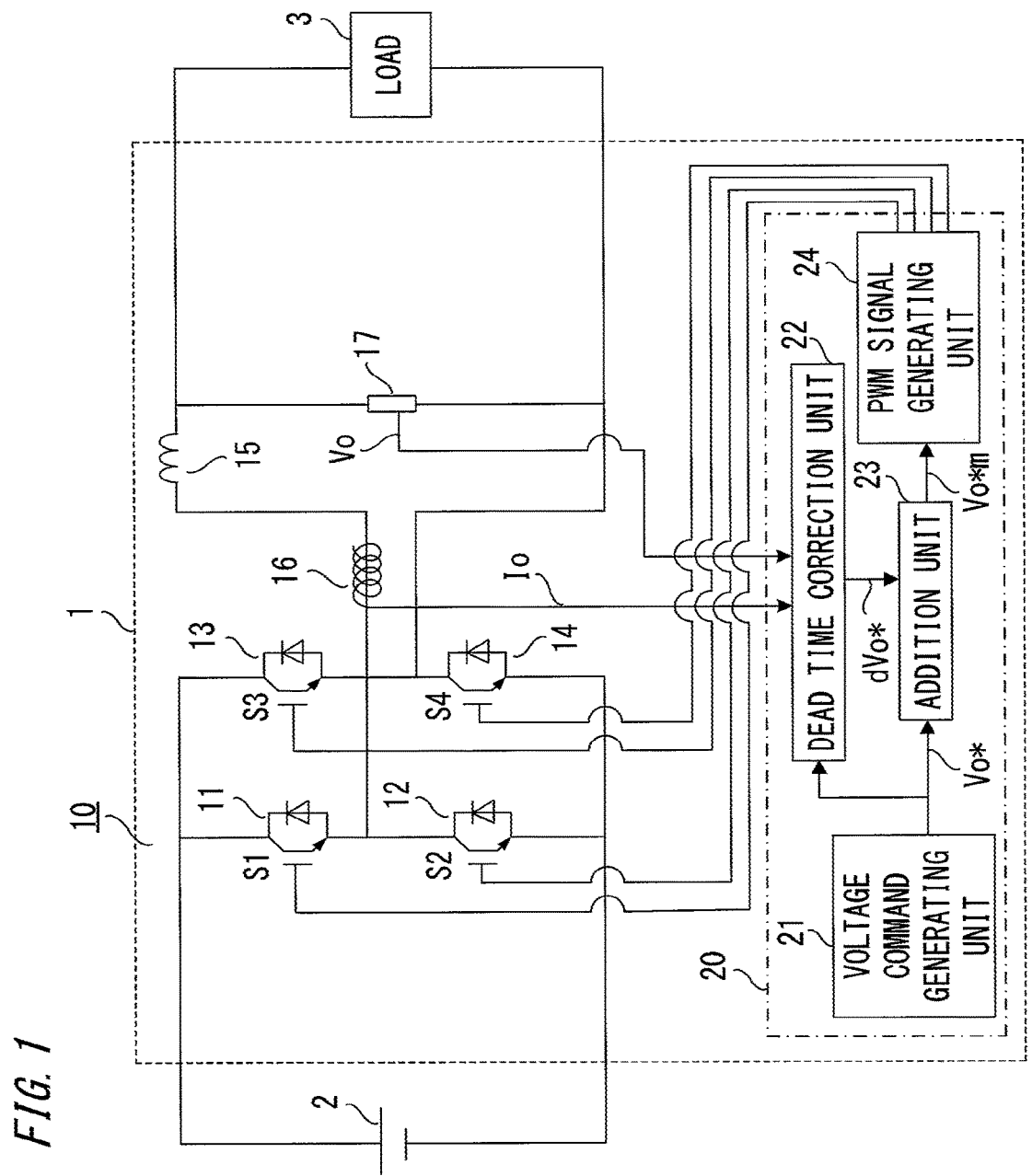
FIG. 1 is a system configuration diagram of a power conversion device according to embodiment 1 of the present invention.

FIG. 1 shows the entire system configuration including the power conversion device 1 according to embodiment 1 of the present invention. The entire system is composed of the power conversion device 1, a DC power supply 2, and an AC load 3.

The power conversion device 1 is composed of a power conversion unit 10 and a control unit 20.

The power conversion unit 10 is composed of: a power conversion circuit having switching elements 11 to 14; a reactor 15; an output current measurement unit 16; and an output voltage measurement unit 17. The reactor 15 is provided for suppressing harmonics.

The control unit 20 is composed of a voltage command generating unit 21, a dead time correction unit 22, an addition unit 23, and a PWM signal generating unit 24.

The operation of the control unit 20 of the power conversion device 1 will be described. A voltage command Vo* generated by the voltage command generating unit 21 and a dead time correction amount dVo* generated by the dead time correction unit 22 are added by the addition unit 23, to generate a dead-time-corrected voltage command Vo*m, and the dead-time-corrected voltage command Vo*m is outputted to the PWM signal generating unit 24. The PWM signal generating unit 24 generates switching signals S1 to S4 according to the dead-time-corrected voltage command Vo*m. Then, the switching elements 11 to 14 are turned on or off in accordance with signals of the switching signals S1 to S4, whereby voltage according to the voltage command Vo* is outputted from the power conversion device 1.

Figure 2:
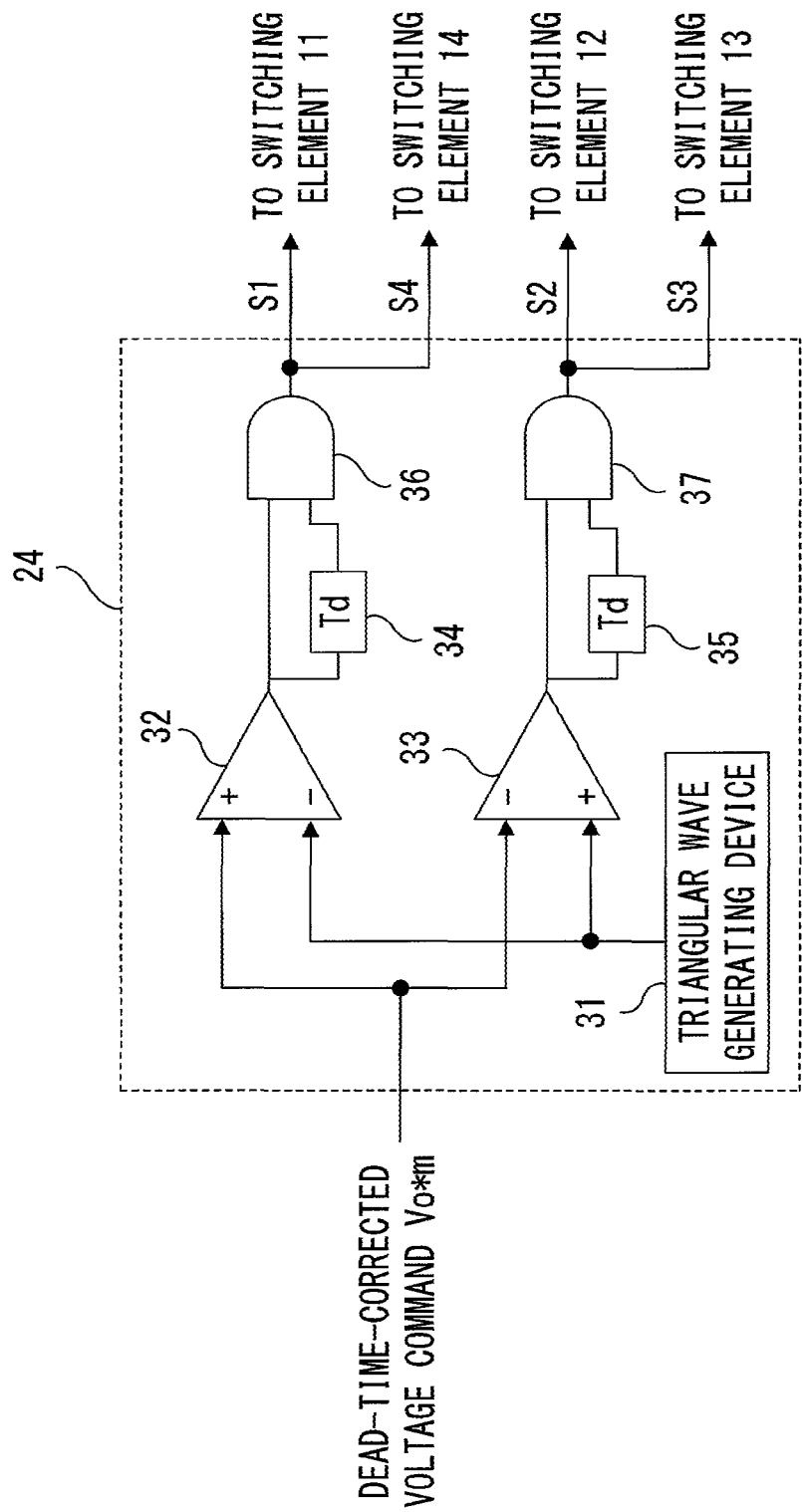
FIG. 2 is a block diagram of a PWM signal generating unit of the power conversion device according to embodiment 1 of the present invention.

FIG. 2 is a block diagram showing an example of the configuration of the PWM signal generating unit 24.

The PWM signal generating unit 24 is composed of a triangular wave generating device 31, comparators 32 and 33, delay devices 34 and 35, and AND circuits 36 and 37.

The delay devices 34 and 35 delay signals from the comparators 32 and 33 by the dead time period. The triangular wave generating device 31 generates a triangular wave having a carrier cycle Tc. Signals from the comparators 32 and 33 and signals from the delay devices 34 and 35 are inputted to the AND circuits 36 and 37, respectively. By the AND circuits 36 and 37, the dead time is interposed into the switching signals S1 to S4.

Here, for simplification of the description, the dead time is interposed by the configuration shown in FIG. 2. However, without limitation thereto, a plurality of triangular wave generating devices having different offsets may be used to interpose the dead time.

Figure 3:
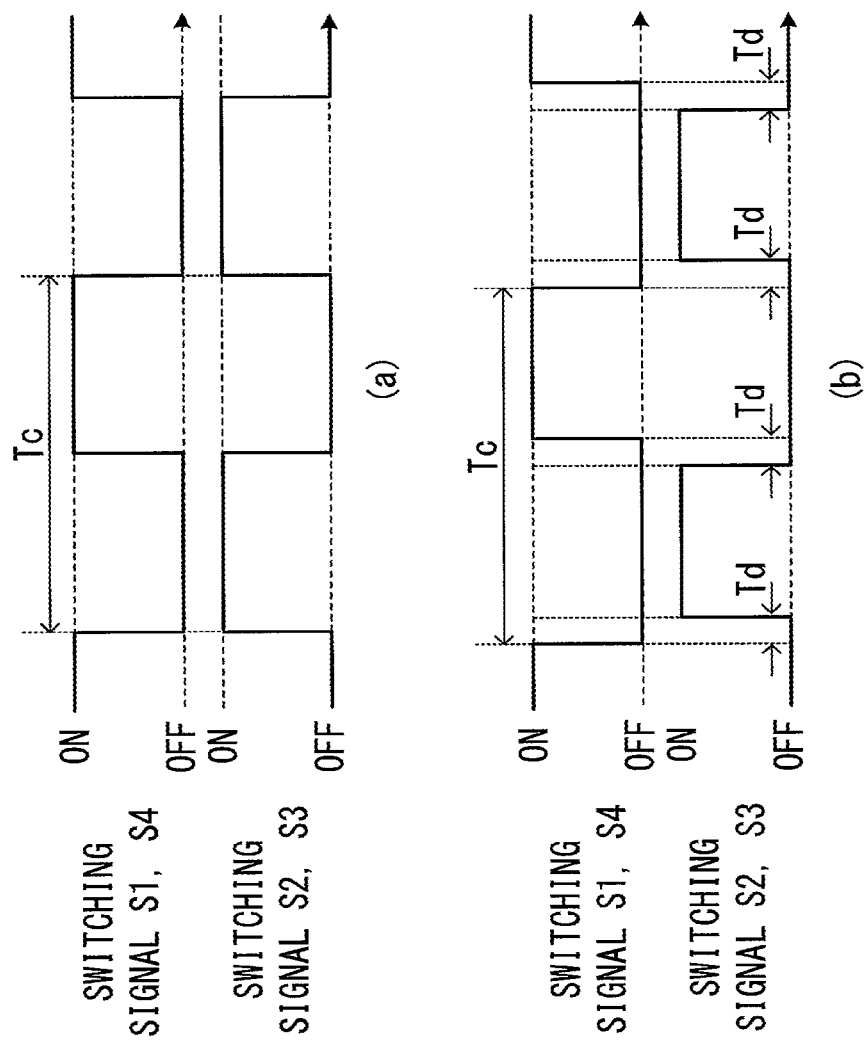
FIG. 3 is a switching signal waveform diagram in the power conversion device according to embodiment 1 of the present invention.

FIG. 3 shows the signal waveforms S1 to S4 supplied from the PWM signal generating unit 24 of the control unit 20 to the switching elements 11 to 14 of the power conversion unit 10.

FIG. 3(a) shows the signal waveforms S1 to S4 in the case where the dead time period is not interposed. FIG. 3(b) shows the signal waveforms S1 to S4 in the case where the dead time period is interposed.

Figure 4:
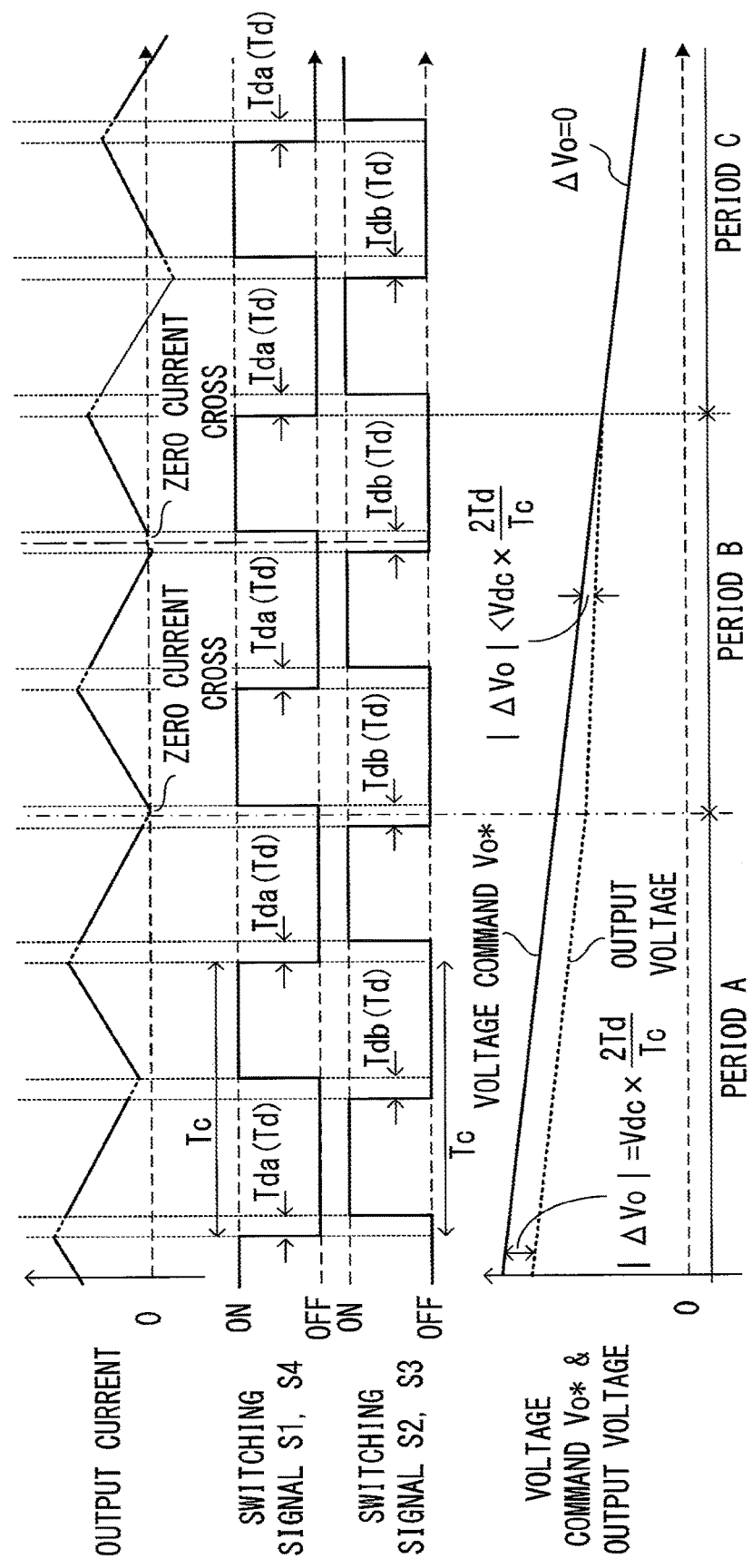
FIG. 4 is an output voltage waveform and an output current waveform diagram in a dead time period in the power conversion device according to embodiment 1 of the present invention.

FIG. 4 shows examples of the output voltage waveform and the output current waveform of the power conversion device 1.

A dead time period after the switching signals S1 and S4 change from ON to OFF is denoted by Tda, and a dead time period after the switching signals S2 and S3 change from ON to OFF is denoted by Tdb. The dead time periods Tda and Tdb have the same length (Td).

In addition, Td denotes the dead time period, and Tc denotes the carrier cycle of the triangular wave generating device 31. Vo denotes the output voltage of the power conversion device 1, Vdc denotes the output voltage of the DC power supply 2, and Vo* denotes the voltage command. ΔVo denotes error voltage between the voltage command Vo* and the output voltage Vo.

It is noted that FIG. 4 shows examples of the waveforms in the vicinity of zero current cross in the case where the output current is positive (the output current has such a polarity as to flow from the power conversion device 1 to the AC load 3).

In the case where the output current has such a polarity as to flow from the power conversion device 1 to the AC load 3, during the dead time period, flyback diodes of the switching elements 12 and 13 conduct, resulting in a state equivalent to the state in which the switching elements 12 and 13 are ON.

Therefore, as shown in period A in FIG. 4, during the periods Tda and Tdb, the output voltage Vo decreases, whereby the output voltage Vo becomes smaller than the voltage command Vo*.

Although not shown, in the case where the output current has such a polarity as to flow from the AC load 3 to the power conversion device 1, during the dead time period, flyback diodes of the switching elements 11 and 14 conduct, resulting in a state equivalent to the state in which the switching elements 11 and 14 are ON.

During the periods Tda and Tdb, the output voltage Vo increases, whereby the output voltage Vo becomes greater than the voltage command Vo*.

In the range (corresponding to period A in FIG. 4) in which the output current is greater than 0 A and the output current does not undergo zero current cross, the error voltage ΔVo between the voltage command Vo* and the output voltage Vo is determined by the polarity of the output current, the dead time period Td, the carrier cycle Tc, and the output voltage Vdc of the DC power supply 2. The error voltage ΔVo is represented by expression (1).

$$\Delta Vo = -(\text{output current polarity}) \times Vdc \times 2Td/Tc \quad (1)$$

In the output current range (period B in FIG. 4) in which the output current undergoes zero current cross, a zero current cross time in which current of the reactor 15 becomes 0 A arises in the dead time period. During the zero current cross time, the flyback diodes of the switching elements 11 to 14 do not conduct, and the switching elements 11 to 14 become OFF.

In the period B in FIG. 4, zero current cross occurs in the period Tdb, and the switching elements 11 to 14 become OFF during the zero current cross time.

Thus, as for change in the output voltage during the period Tdb, decrease in the output voltage Vo is reduced during only the zero current cross time. If decrease in the output voltage Vo is reduced in proportion to the zero current cross time in the period Tdb, the error voltage ΔVo is represented by expression (2).

$$\Delta Vo = -(\text{output current polarity}) \times Vdc \times (f(T0))/Tc \quad (2)$$

In expression (2), f(T0) is a function having a zero current cross time as a variable.

In the range in which the output current varies between positive and negative in accordance with the carrier cycle Tc without zero current cross (period C in FIG. 4), during the period Tda, the flyback diodes of the switching elements 12 and 13 conduct, resulting in a state equivalent to the state in which the switching elements 12 and 13 are ON. Thus, the output voltage Vo decreases.

During the period Tdb, the flyback diodes of the switching elements 11 and 14 conduct, resulting in a state equivalent to the state in which the switching elements 11 and 14 are ON. Thus, the output voltage Vo increases.

Since the decrease in the output voltage Vo during the period Tda is equal to the increase in the output voltage Vo during the period Tdb, the output voltage Vo becomes the same as the voltage command Vo*. Therefore, the error voltage ΔVo is 0V.

Although FIG. 4 shows the case where zero current cross occurs in the period Tdb, the same applies to the case where zero current cross occurs in the period Tda.

Thus, since the error voltage ΔVo changes in accordance with the zero current cross time of the output current, the dead time correction unit 22 corrects the error voltage ΔVo to 0V. Therefore, the dead time correction unit 22 calculates the dead time correction amount dVo* corresponding to the error voltage ΔVo, from the zero current cross time.

Then, the dead time correction amount dVo* calculated by the dead time correction unit 22 is added to the voltage command Vo* by the addition unit 23, to generate the dead-time-corrected voltage command Vo*m.

However, in the power conversion device 1, it is difficult to constantly measure the output current as shown in FIG. 4, and in general, the output current is measured only once in the carrier cycle Tc. It is impossible to measure the zero current cross time of the output current by such an output current measurement method.

Accordingly, in embodiment 1 of the present invention, reactor voltage VL is estimated from the output voltage Vo, and further, the zero current cross time is estimated from the reactor voltage VL and the measured output current.

Figure 5:
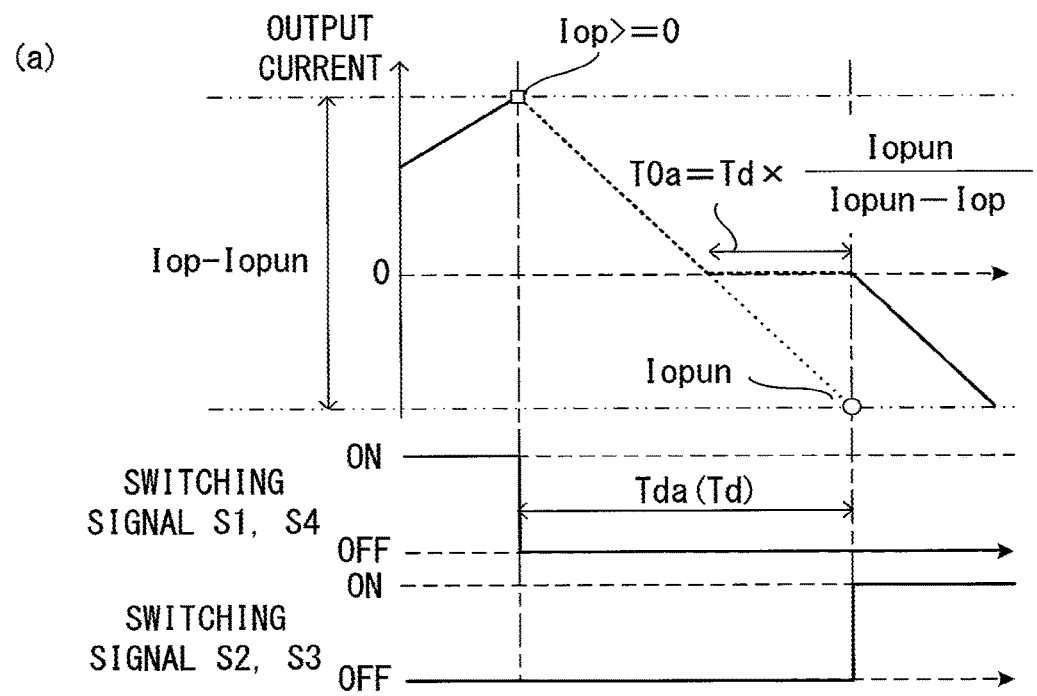
FIG. 5 is a waveform diagram in zero current cross time in the power conversion device according to embodiment 1 of the present invention.
Figure 5:
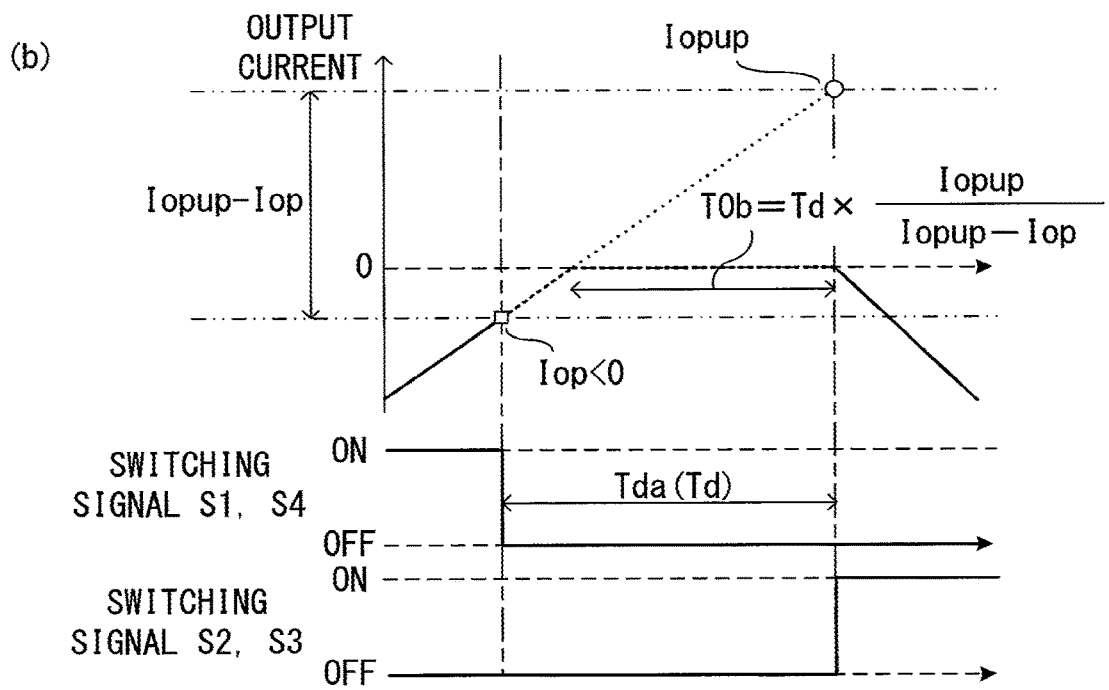
Figure 6:
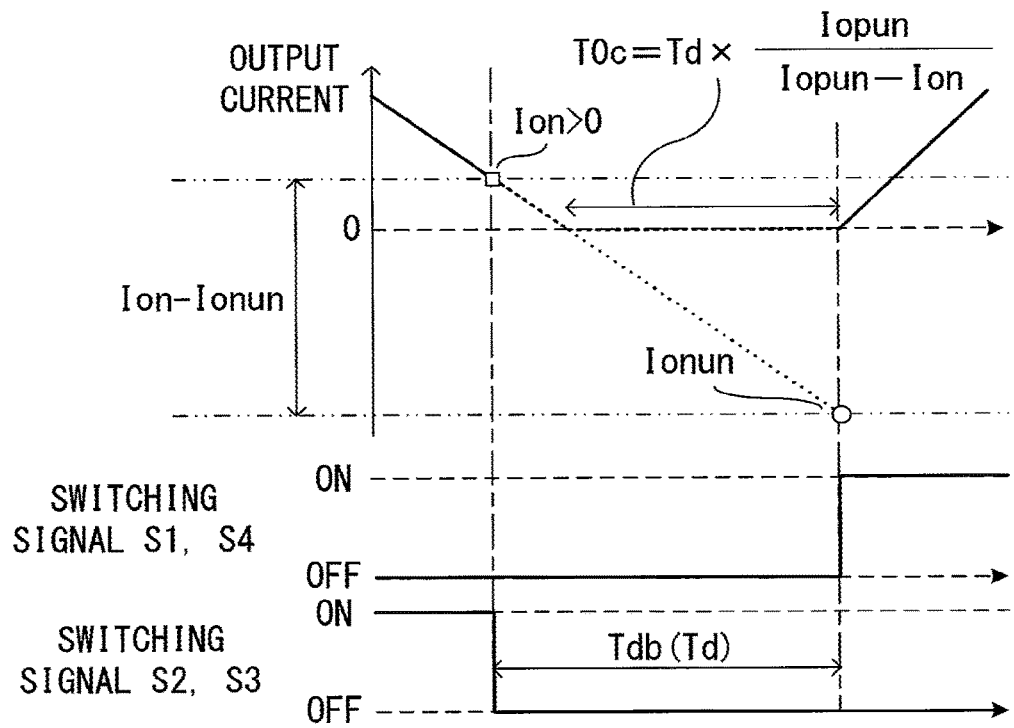
FIG. 6 is a waveform diagram in zero current cross time in the power conversion device according to embodiment 1 of the present invention.
Figure 6:
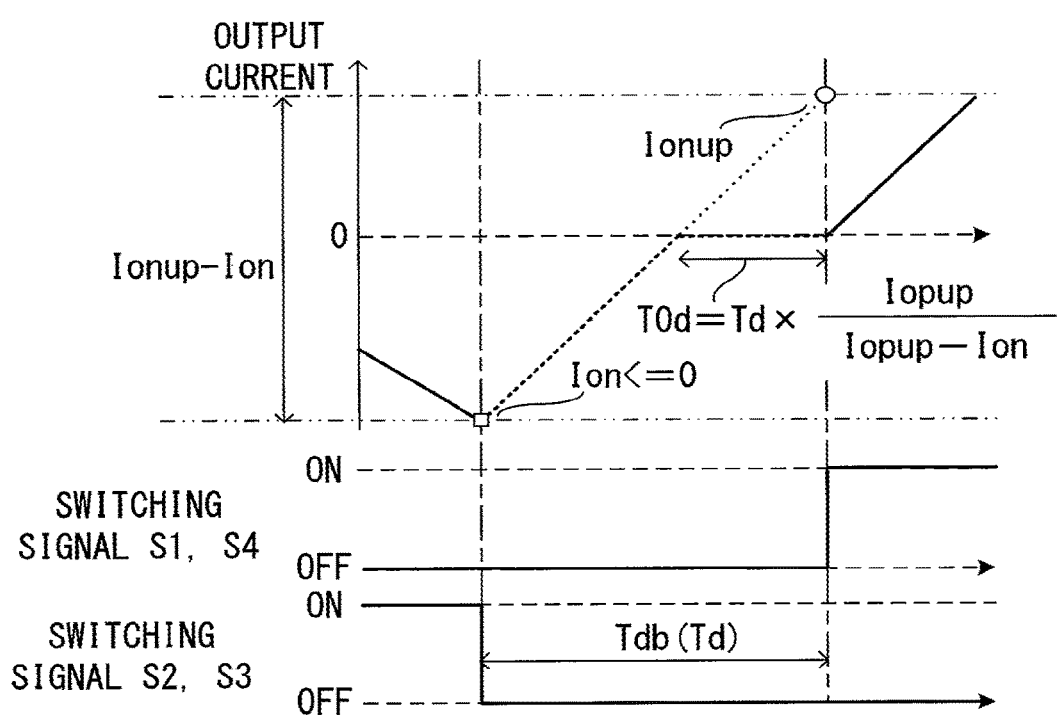

FIG. 5 and FIG. 6 are diagrams showing examples of waveforms in the zero current cross time, according to embodiment 1 of the present invention.

FIG. 5(a) shows the case where the output current changes from positive to negative during the period Tda, and FIG. 5(b) shows the case where the output current changes from negative to positive during the period Tda.

FIG. 6(a) shows the case where the output current changes from positive to negative during the period Tdb, and FIG. 6(b) shows the case where the output current changes from negative to positive during the period Tdb.

The definitions of Tda, Tdb, and Td (dead time period) are the same as in FIG. 4, so the description thereof is omitted.

In FIG. 5 and FIG. 6, Iop denotes the output current value when the switching signals S1 and S4 change from ON to OFF, Iopun denotes the output current value in the case where the output current has decreased from Iop during the dead time period, and Iopup denotes the output current value in the case where the output current has increased from Iop during the dead time period.

Ion denotes the output current value when the switching signals S2 and S3 change from ON to OFF, Ionun denotes the output current value in the case where the output current has decreased from Ion during the dead time period, and Ionup denotes the output current value in the case where the output current has increased from Ion during the dead time period.

T0a denotes the cross time of the output current in the case where the output current decreases during the period Tda, T0b denotes the cross time of the output current in the case where the output current increases during the period Tda, T0c denotes the cross time of the output current in the case where the output current decreases during the period Tdb, and T0d denotes the cross time of the output current in the case where the output current increases during the period Tdb.

In addition, change in the output current during the dead time period (period Tda or period Tdb) is linear with respect to time.

In FIG. 5(a), since change in the output current is linear with respect to time, the cross time T0a of the output current in the case where the output current decreases during the period Tda (Iop>=0 and Ion<=0) is calculated from the ratio between Iopun and Iopun−Iop, and the dead time period Td, as represented by expression (3).

$$T0a = Td \times Iopun/(Iopun-Iop) \quad (3)$$

Here, using the voltage Vdc of the DC power supply 2 and the carrier cycle Tc of the triangular wave generating device 31, voltage change during the period T0a is 0 to Vdc×Td/Tc.

In FIG. 5(b), since change in the output current is linear with respect to time, the cross time T0b of the output current in the case where the output current increases during the period Tda (Iop<0 and Ion<0) is calculated from the ratio between Iopup and Iopup−Iop, and the dead time period Td, as represented by expression (4).

$$T0b = Td \times Iopup/(Iopup-Iop) \quad (4)$$

Here, using the voltage Vdc of the DC power supply 2 and the carrier cycle Tc of the triangular wave generating device 31, voltage change during the period T0b is Vdc×Td/Tc to 2×Vdc×Td/Tc.

In FIG. 6(a), since change in the output current is linear with respect to time, the cross time T0c of the output current in the case where the output current decreases during the period Tdb (Iop>0 and Ion>0) is calculated from the ratio between Ionun and Ionun−Ion, and the dead time period Td, as represented by expression (5).

$$T0c = Td \times Ionun/(Ionun-Ion) \quad (5)$$

Here, using the voltage Vdc of the DC power supply 2 and the carrier cycle Tc of the triangular wave generating device 31, voltage change during the period T0c is −2×Vdc×Td/Tc to −Vdc×Td/Tc.

In FIG. 6(b), since change in the output current is linear with respect to time, the cross time T0d of the output current in the case where the output current increases during the period Tdb (Iop>=0 and Ion<=0) is calculated from the ratio between Ionup and Ionup−Ion, and the dead time period Td, as represented by expression (6).

$$T0d = Td \times Ionup/(Ionup-Ion) \quad (6)$$

Here, using the voltage Vdc of the DC power supply 2 and the carrier cycle Tc of the triangular wave generating device 31, voltage change during the period T0d is −Vdc×Td/Tc to 0.

Figure 7:
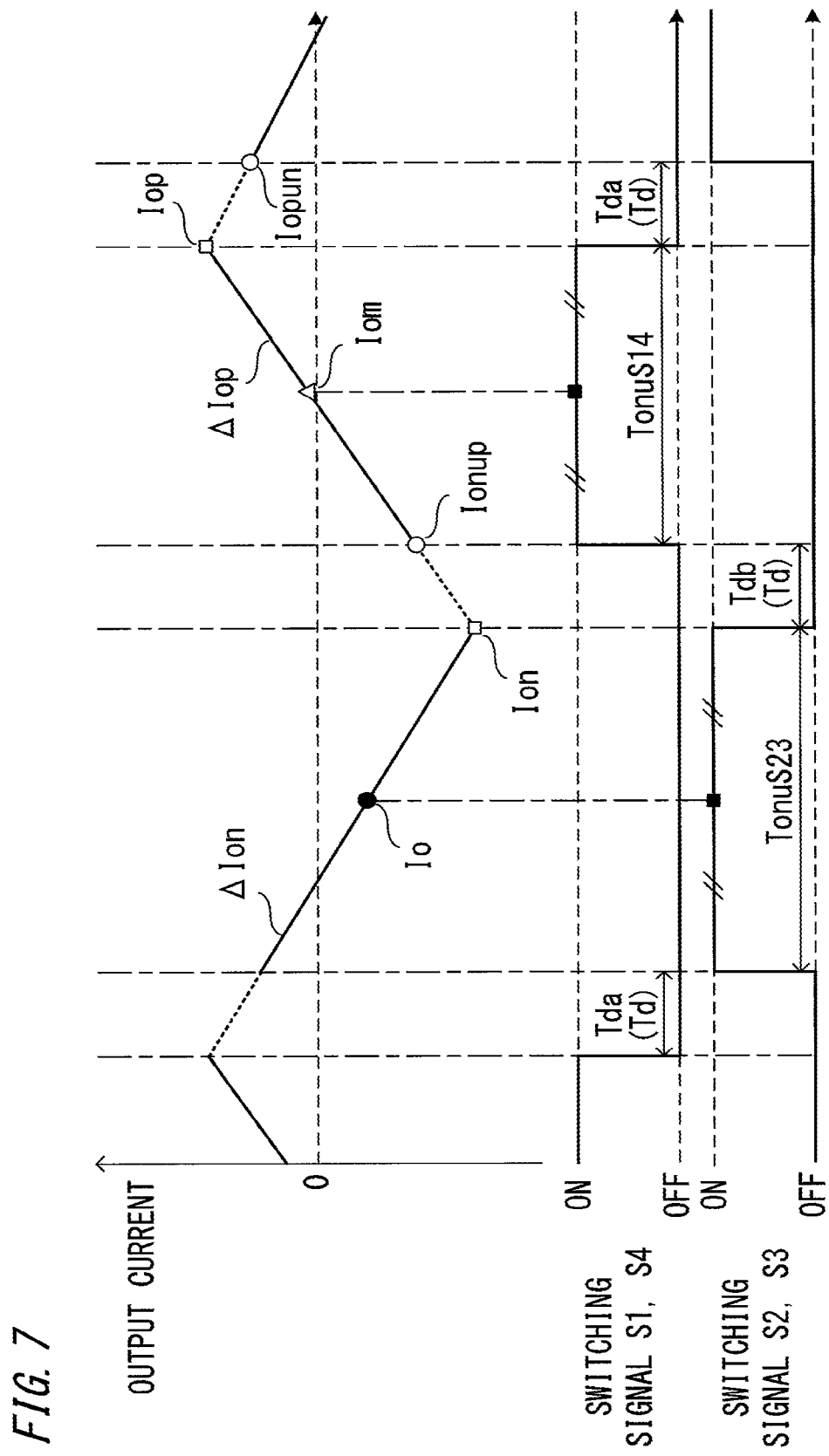
FIG. 7 illustrates change in output current during the dead time period in the power conversion device according to embodiment 1 of the present invention.
Figure 8:
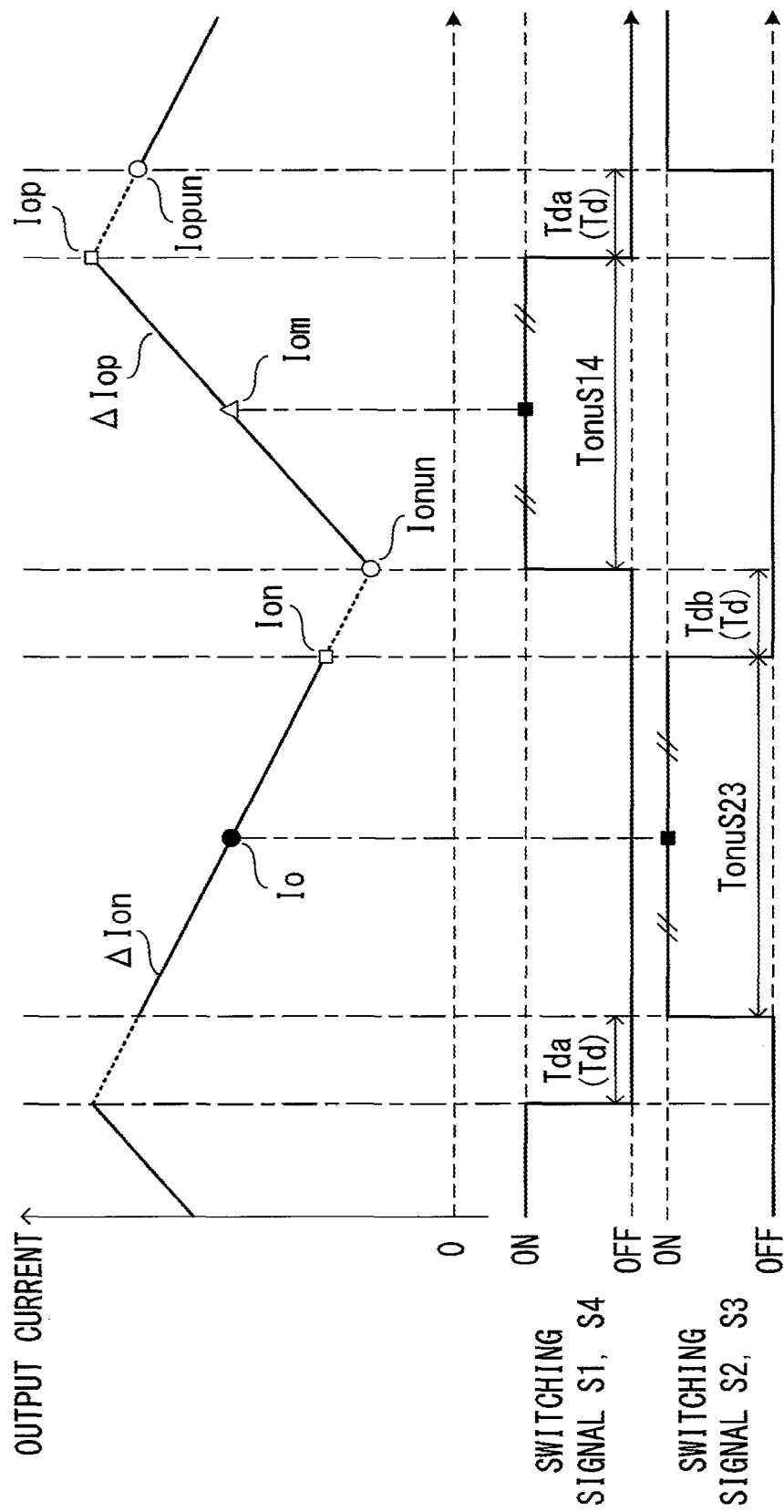
FIG. 8 illustrates change in output current during the dead time period in the power conversion device according to embodiment 1 of the present invention.
Figure 9:
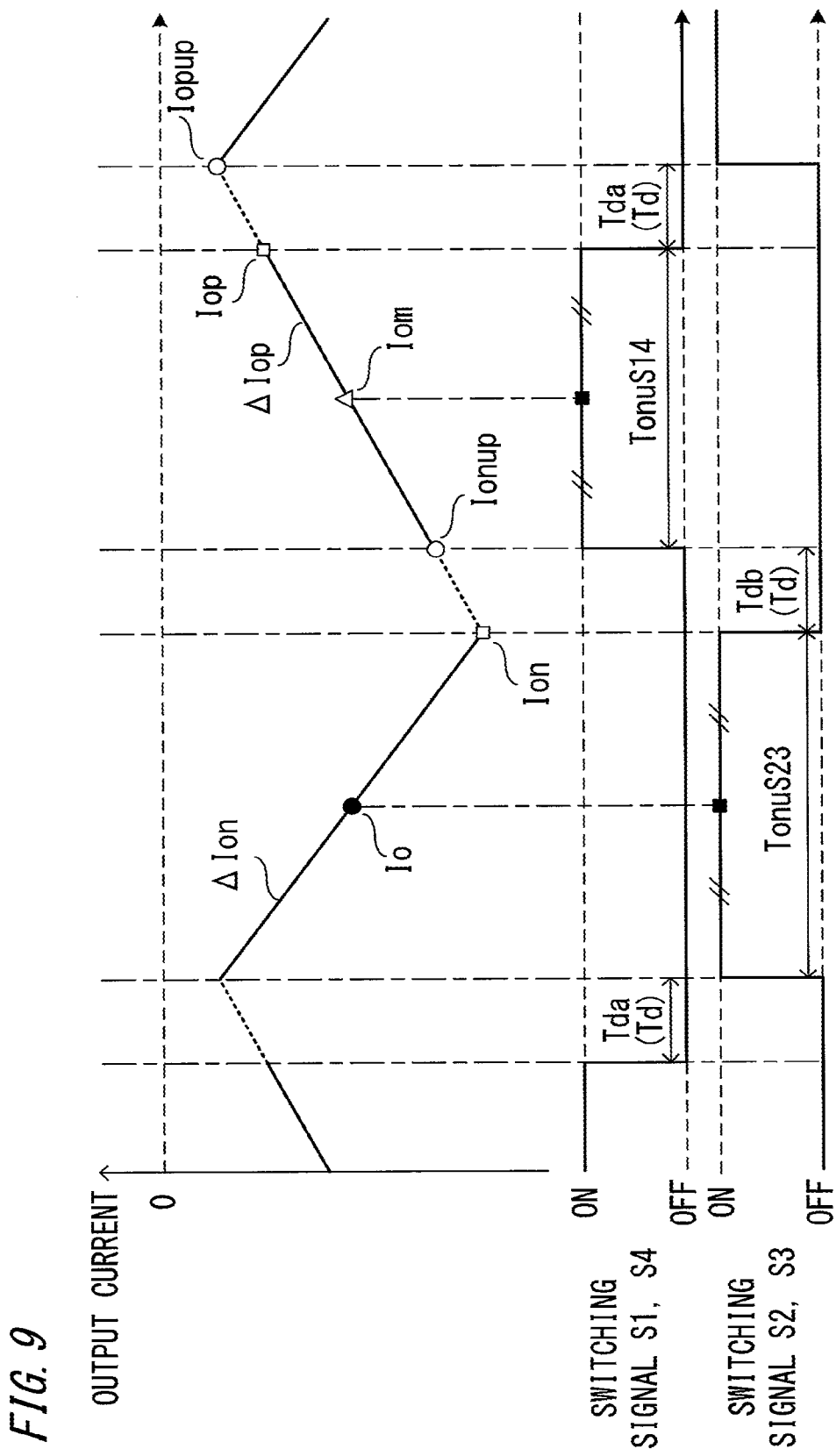
FIG. 9 illustrates change in output current during the dead time period in the power conversion device according to embodiment 1 of the present invention.

FIG. 7 to FIG. 9 illustrate change in the output current during the dead time period, according to embodiment 1 of the present invention.

FIG. 7 shows the case where Iop>=0 and Ion<=0, specifically, the case where the output current decreases in the period Tda and the output current increases in the period Tdb.

FIG. 8 shows the case where Iop>0 and Ion>0, specifically, the output current decreases in the period Tda and the output current decreases in the period Tdb.

FIG. 9 shows the case where Iop<0 and Ion<0, specifically, the case where the output current increases in the period Tda and the output current increases in the period Tdb.

The definitions of Tda, Tdb, and Td (dead time period) are the same as in FIG. 4, FIG. 5, and FIG. 6, so the description thereof is omitted. In addition, the definitions of Tc, Iop, Iopun, Iopup, Ion, Ionun, and Ionup are the same as in FIG. 5 and FIG. 6, so the description thereof is omitted.

In FIG. 7 to FIG. 9, TonuS23 denotes ON time of the switching signals S2 and S3, calculated from the voltage command Vo*, and ΔIon denotes the slope of the output current in TonuS23.

TonuS14 denotes ON time of the switching signals S1 and S4, calculated from the voltage command Vo*, and ΔIop denotes the slope of the output current in TonuS14.

Io denotes measured output current, and Iom is the output current at the center of the period in which the switching signals S1 and S4 are ON signals. In FIG. 7 to FIG. 9, the measured output current Io is a value measured at the center of the period in which the switching signals S2 and S3 are ON signals. ΔIon and ΔIop are slopes of the output current that are determined by the voltage VL of the reactor 15 and inductance L of the reactor 15.

The reactor voltage VL in the case of ΔIon is estimated as −Vdc−Vo, and the reactor voltage VL in the case of ΔIop is estimated as Vdc−Vo. In addition, Ion is calculated from the measured output current Io, ΔIon, and Tonu23, and if the measured output currents Io and Iom are equal to each other, Ion is calculated from the measured output current Io, ΔIop, and Tonu14.

The output currents Ionun, Ionup, Iopun, Iopup after the dead time period in the case of not considering zero current cross are calculated from ΔIon and Td if the output current decreases from Iop or Ion, and are calculated from ΔIop and Td if the output current increases from Iop or Ion.

As for the measured output current Io, instead of measuring the measured output current Io at the center of the period in which the switching signals S2 and S3 are ON signals, if the phase relative to the carrier cycle Tc of the triangular wave generating device 31 is figured out, the same calculation can be performed by adding a coefficient or a constant in calculation of the Iop and Ion.

From the above, on the basis of expressions (3) to (6) of the zero current cross time of the output current, the dead time correction amount dVo* is calculated for each condition of Ion and Iop shown below.

First, the case where Iop>=0 A and Ion<=0 A, specifically, the case corresponding to FIG. 5(a) and FIG. 6(b) will be described. Here, dV*ua denotes the dead time correction amount dVo* corresponding to FIG. 5(a), and dV*ud denotes the dead time correction amount dVo* corresponding to FIG. 6(b).

$$dV^*ua = -Vdc \times T0a/Tc \quad (7)$$

Here, as a limiter, $-Vdc \times Td/Tc <= dV^*ua <= 0$ is set.

$$dV^*ud = Vdc \times T0d/Tc \quad (8)$$

Here, as a limiter, $0 <= dV^*ud <= Vdc \times Td/Tc$ is set.

Thus, the dead time correction amount dVo* is represented by expression (9) which is a sum of expression (7) and expression (8).

$$dVo^* = dV^*ua + dV^*ud \quad (9)$$

As a limiter, $-Vdc \times Td/Tc <= dV^* <= Vdc \times Td/Tc$ is set.

Next, the case where Iop<0 A and Ion<0 A, specifically, the case corresponding to FIG. 5(b) will be described. The dead time correction amount dVo* is represented by expression (10).

$$dVo^* = -Vdc \times (2 \times Td - T0b))/Tc \quad (10)$$

As a limiter, $-Vdc \times 2Td/Tc <= dV^* <= -Vdc \times (Td/Tc)$ is set.

Next, the case where Iop>0 A and Ion>0 A, specifically, the case corresponding to FIG. 6(a) will be described. The dead time correction amount dVo* is represented by expression (11).

$$dVo^* = Vdc \times (2 \times Td - T0c)/Tc \quad (11)$$

As a limiter, $Vdc \times Td/Tc <= dV^* <= Vdc \times (2Td/Tc)$ is set.

The addition unit 23 adds the dead time correction amount dVo* indicated by expressions (7) to (11) according to the condition of Ion and Iop, to the output voltage command Vo* generated by the voltage command generating unit 21, thereby correcting the output voltage Vo of the power conversion device 1 to the voltage command Vo*.

Figure 10:
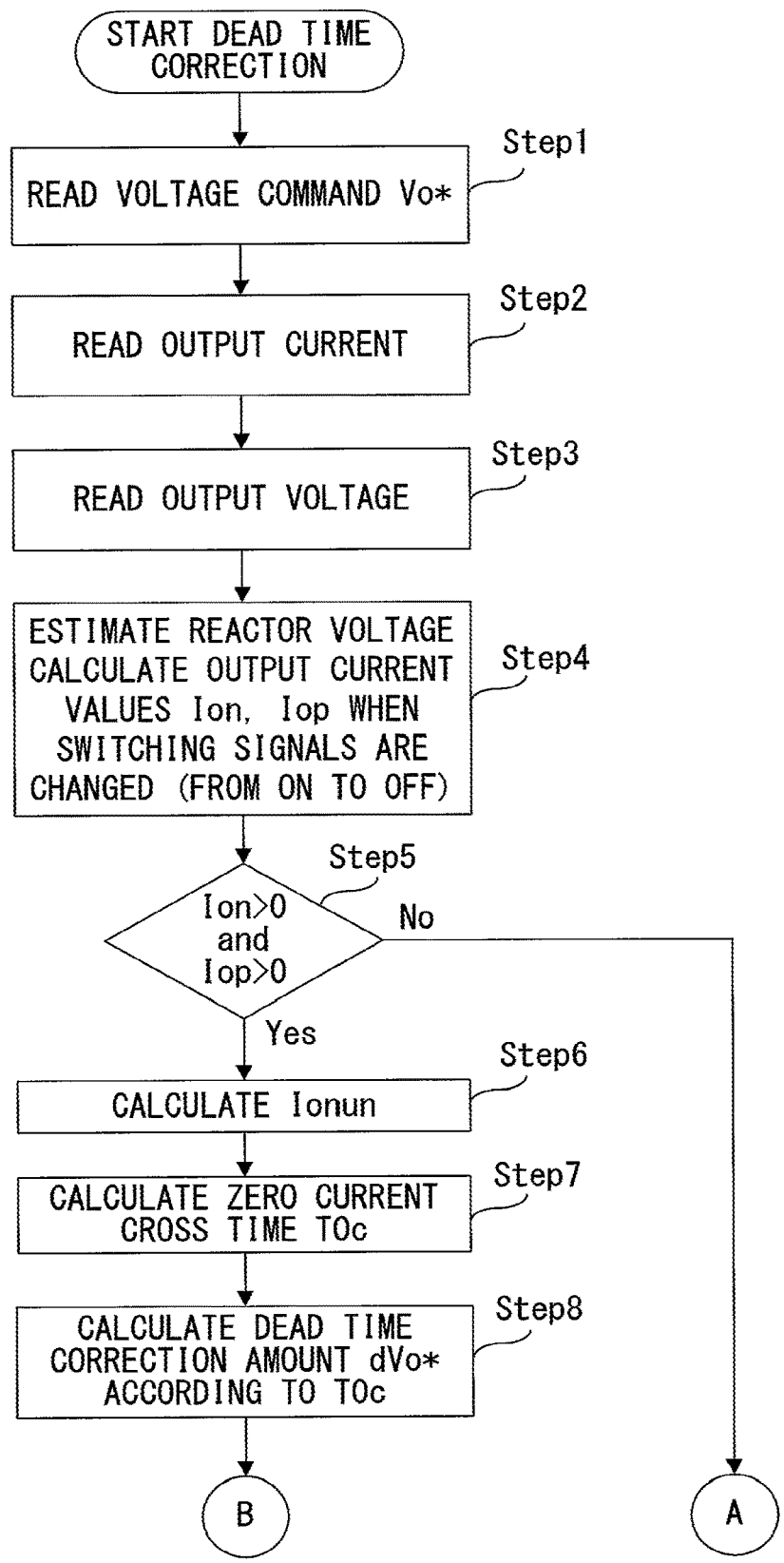
FIG. 10 is a flowchart for calculating a dead time correction amount in the power conversion device according to embodiment 1 of the present invention.
Figure 11:
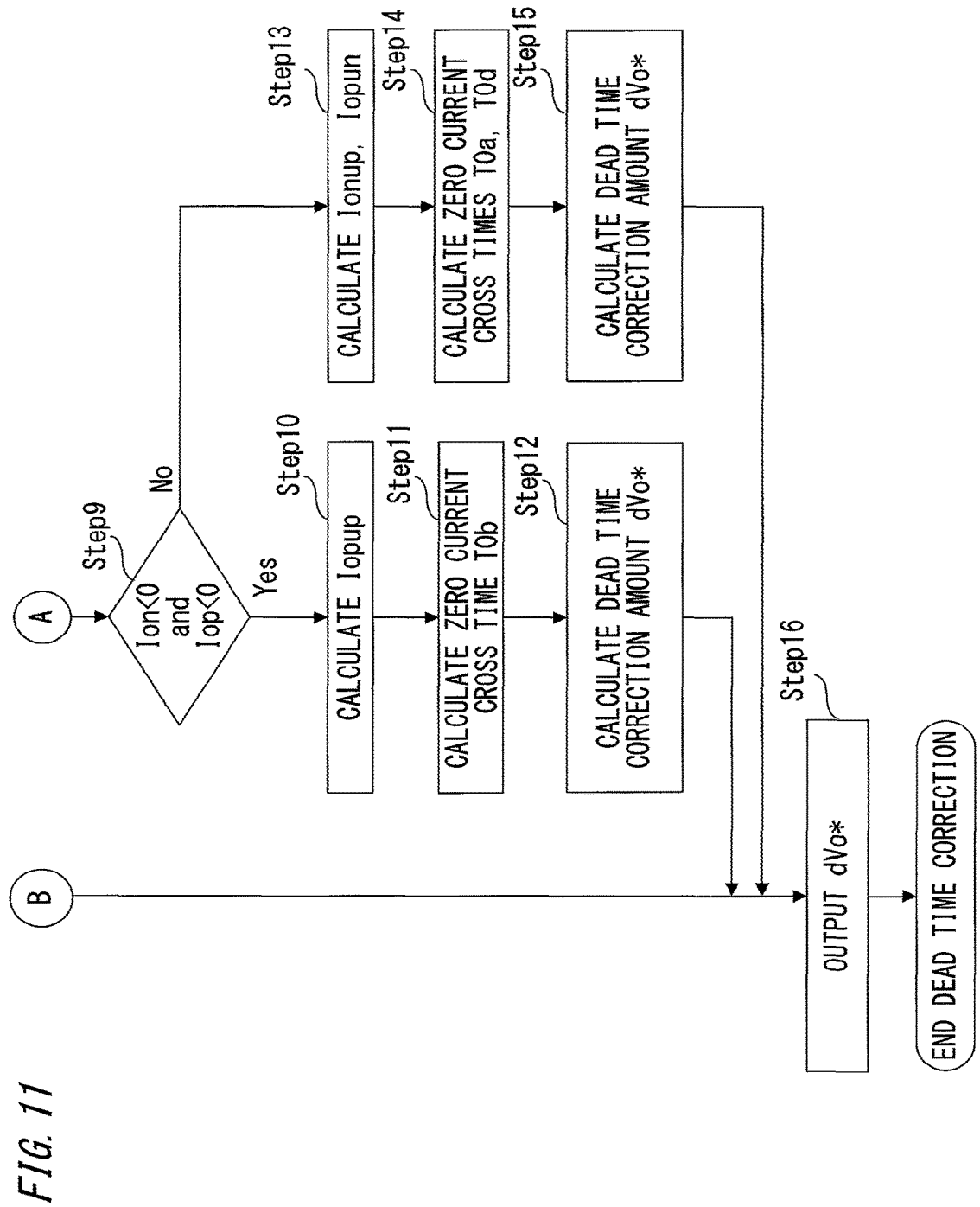
FIG. 11 is a flowchart for calculating the dead time correction amount in the power conversion device according to embodiment 1 of the present invention.

FIG. 10 and FIG. 11 are flowcharts for calculating the dead time correction amount dVo* in the dead time correction unit 22, according to embodiment 1 of the present invention.

Hereinafter, with reference to FIG. 10 and FIG. 11, a process for calculating the dead time correction amount dVo* in the dead time correction unit 22 will be described.

In Step 1, the voltage command Vo* is read from the voltage command generating unit 21.

In Step 2, the output current Io is read from the output current measurement unit 16.

In Step 3, the output voltage Vo is read from the output voltage measurement unit 17.

In Step 4, the reactor voltage VL is estimated from the voltage command Vo*, the output voltage Vo, and the output voltage Vdc of the DC power supply 2 that is assumed. Using the estimated reactor voltage VL, the carrier cycle Tc of the triangular wave generating device 31, and the output current Io, the output current value Ion when the switching signals S2 and S3 change from ON to OFF is calculated. Further, the output current value Iop when the switching signals S1 and S4 change from ON to OFF is calculated.

In Step 5, if Ion and Iop are greater than 0 A, the process proceeds to Step 6 to Step 8. Otherwise, the process proceeds to Step 9.

In Step 6, the output current value Ionun in the case where the output current has decreased from Ion during the dead time period is calculated.

In Step 7, the zero current cross time T0c is calculated from expression (5).

In Step 8, the dead time correction amount dVo* is calculated from expression (11).

In Step 9, if Ion and Iop are smaller than 0 A, the process proceeds to Step 10 to Step 12. Otherwise, the process proceeds to Step 13 to Step 15.

In Step 10, the output current value Iopup in the case where the output current has increased from Iop during the dead time period is calculated.

In Step 11, the zero current cross time T0b is calculated from expression (4).

In Step 12, the dead time correction amount dVo* is calculated from expression (10).

If Step 9 is not satisfied (Ion<=0 A and Iop>=0 A), the process proceeds to Step 13 to Step 15.

In Step 13, the output current value Ionup in the case where the output current has increased from Ion during the dead time period, and the output current value Iopun in the case where the output current has decreased from Iop during the dead time period, are calculated.

In Step 14, the zero current cross times T0a and T0d are calculated from expressions (3) and (6).

In Step 15, the dead time correction amount dVo* is calculated from expressions (7) to (9).

In Step 16, the dead time correction amount dVo* calculated in Step 8, Step 12, and Step 15 is outputted to the addition unit 23.

Figure 12:
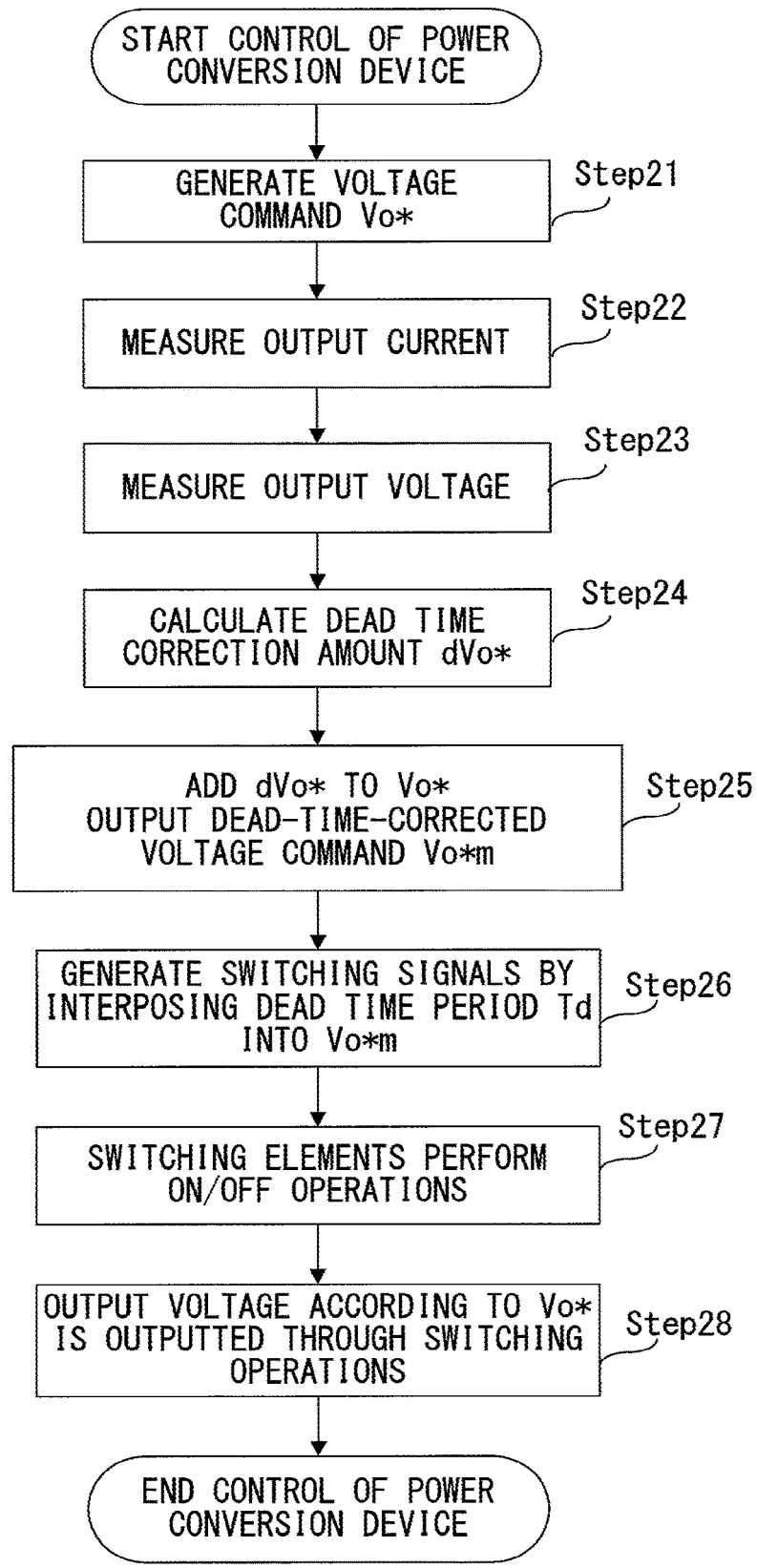
FIG. 12 is a control flowchart in the power conversion device according to embodiment 1 of the present invention.

FIG. 12 shows a control flow in the power conversion device 1 according to embodiment 1 of the present invention.

Hereinafter, the control process until the power conversion device 1 outputs the output voltage Vo according to the voltage command Vo* will be described with reference to FIG. 12.

In Step 21, the voltage command generating unit 21 generates the voltage command Vo*.

In Step 22, the output current measurement unit 16 measures the output current.

In Step 23, the output voltage measurement unit 17 measures the output voltage.

In Step 24, the dead time correction amount dVo* according to the zero current cross time is calculated in accordance with the flowcharts for calculating the dead time correction amount dVo* in the dead time correction unit 22 as described in FIG. 10 and FIG. 11.

In Step 25, the addition unit 23 adds the voltage command Vo* and the dead time correction amount dVo*, to output the dead-time-corrected voltage command Vo*m.

In Step 26, the PWM signal generating unit 24 generates switching signals by interposing the dead time period into the dead-time-corrected voltage command Vo*m.

In Step 27, the switching elements 11 to 14 perform ON/OFF operations in accordance with the switching signals.

In Step 28, the power conversion device 1 outputs, through the reactor 15, output voltage according to Vo* through the switching operations on the basis of the output voltage of the DC power supply 2.

Figure 13:
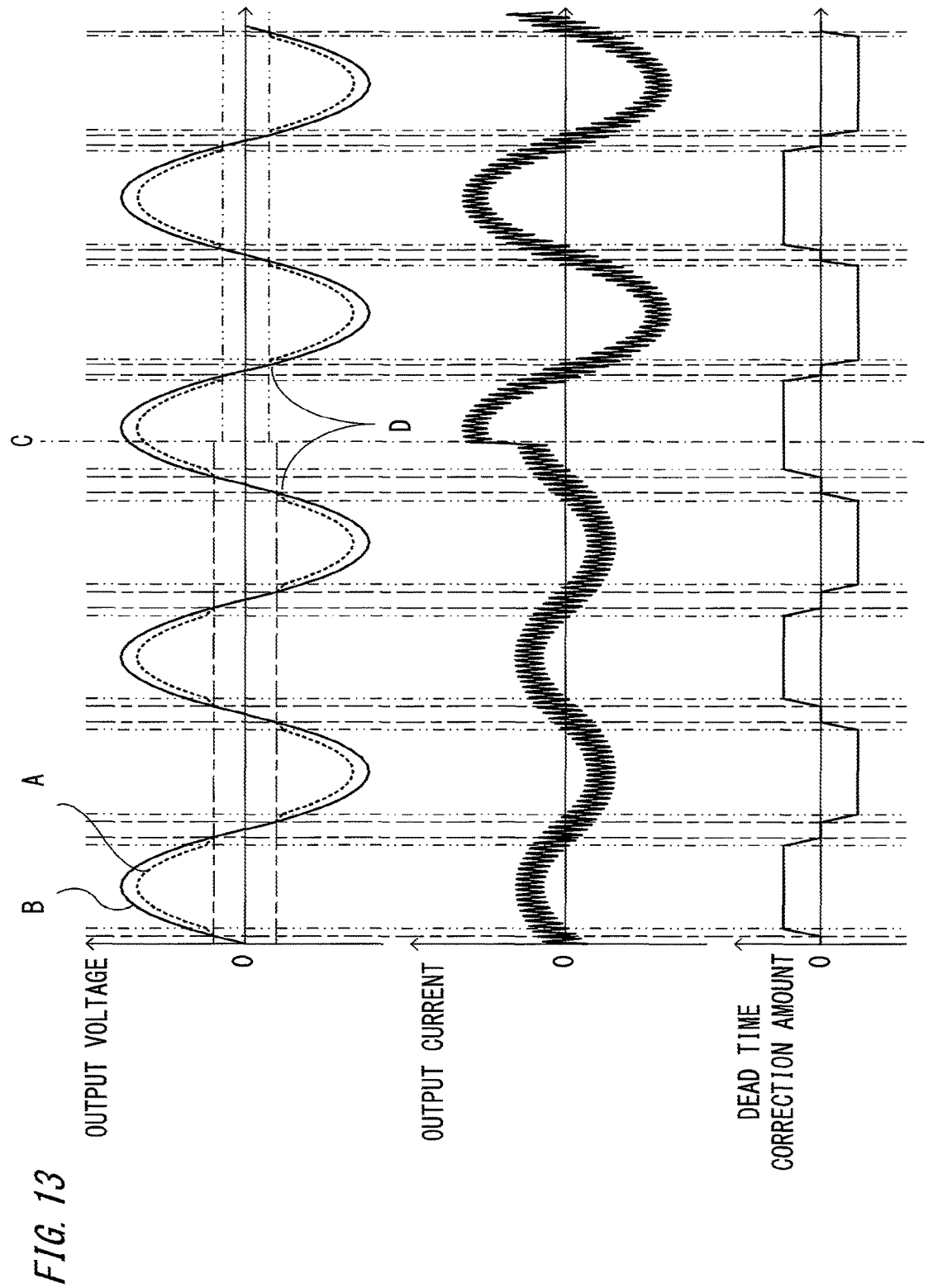
FIG. 13 illustrates the effect of dead time correction in the power conversion device according to embodiment 1 of the present invention.

FIG. 13 shows an example of the effect of dead time correction according to embodiment 1 of the present invention. With reference to FIG. 13, the effect of dead time correction according to embodiment 1 will be described. It is noted that FIG. 13 shows an example in which the load increases and the output current increases.

In FIG. 13, an output voltage waveform (dotted line) A indicates the case of not performing correction, and an output voltage waveform (solid line) B indicates the case of performing correction. In addition, C indicates a time point at which the load varies. D indicates change in the timing of occurrence of error voltage.

As a result of load variation occurring at C, the output current increases, whereby the zero current cross time of the output current and the timing thereof are changed, and thus the timing of occurrence of error voltage due to the dead time period is also changed (see D).

By applying the invention of the present embodiment 1, change in the zero current cross time due to change in the output current can be instantaneously recognized, and therefore it is possible to instantaneously perform proper dead time correction even if the output current changes. Thus, it is possible to instantaneously calculate the dead time correction amount even in the case where the output current changes due to change in power consumption in the load or the like or in the case where the load is a capacitor-input load having nonlinear characteristics.

Therefore, since there is no possibility that the output voltage becomes overvoltage due to erroneous dead time correction and the output current becomes overcurrent, the reactor at the output part of the power conversion device can be downsized.

In addition, in the autonomous operation that is not interconnected with a power grid, in the case where the distributed power supply having an isolated operation detection unit, and the power conversion device are interconnected with each other, it is possible to prevent occurrence of voltage change due to dead time in the vicinity of zero cross of the output voltage, and suppress change in the frequency. Thus, it becomes possible to prevent the distributed power supply from detecting isolated operation on the basis of frequency change due to the dead time.

Further, the functions of the control unit 20 such as the dead time correction unit 22 can be implemented by S/W (SOFTWARE), and in the case of using S/W, it is possible to decrease the number of components of H/W (HARDWARE) and downsize the power conversion device.

In the above description, the output current measurement unit 16 and the output voltage measurement unit 17 are components of the power conversion unit 10, but may be components of the control unit 20.

In embodiment 1, the average reactor voltage in the carrier cycle is estimated (Vo*−Vo), and the zero current cross time is calculated using the estimated reactor voltage. However, without using the estimated reactor voltage, the zero current cross time may be calculated using the output voltage, whereby the same effect can be obtained.

As described above, the power conversion device of embodiment 1 calculates the zero current cross time of the output current using the estimated reactor voltage, and calculates the dead time correction amount from the zero current cross time of the output current. Therefore, the power conversion device of embodiment 1 can instantaneously calculate the dead time correction amount even in the case where the output current changes due to load change or the like or in the case where the load has nonlinear characteristics. In addition, in the case of performing operation interconnected with the distributed power supply, in the autonomous operation, the distributed power supply can be prevented from erroneously detecting isolated operation on the basis of frequency change due to the dead time. In addition, since the efficiency of the power conversion device is improved, an effect of saving energy is obtained.

Embodiment 2

The power conversion device of embodiment 1 calculates the dead time correction amount using the zero current cross time of the output current. A power conversion device of embodiment 2 calculates a dead time correction amount using an output current change amount.

Figure 14:
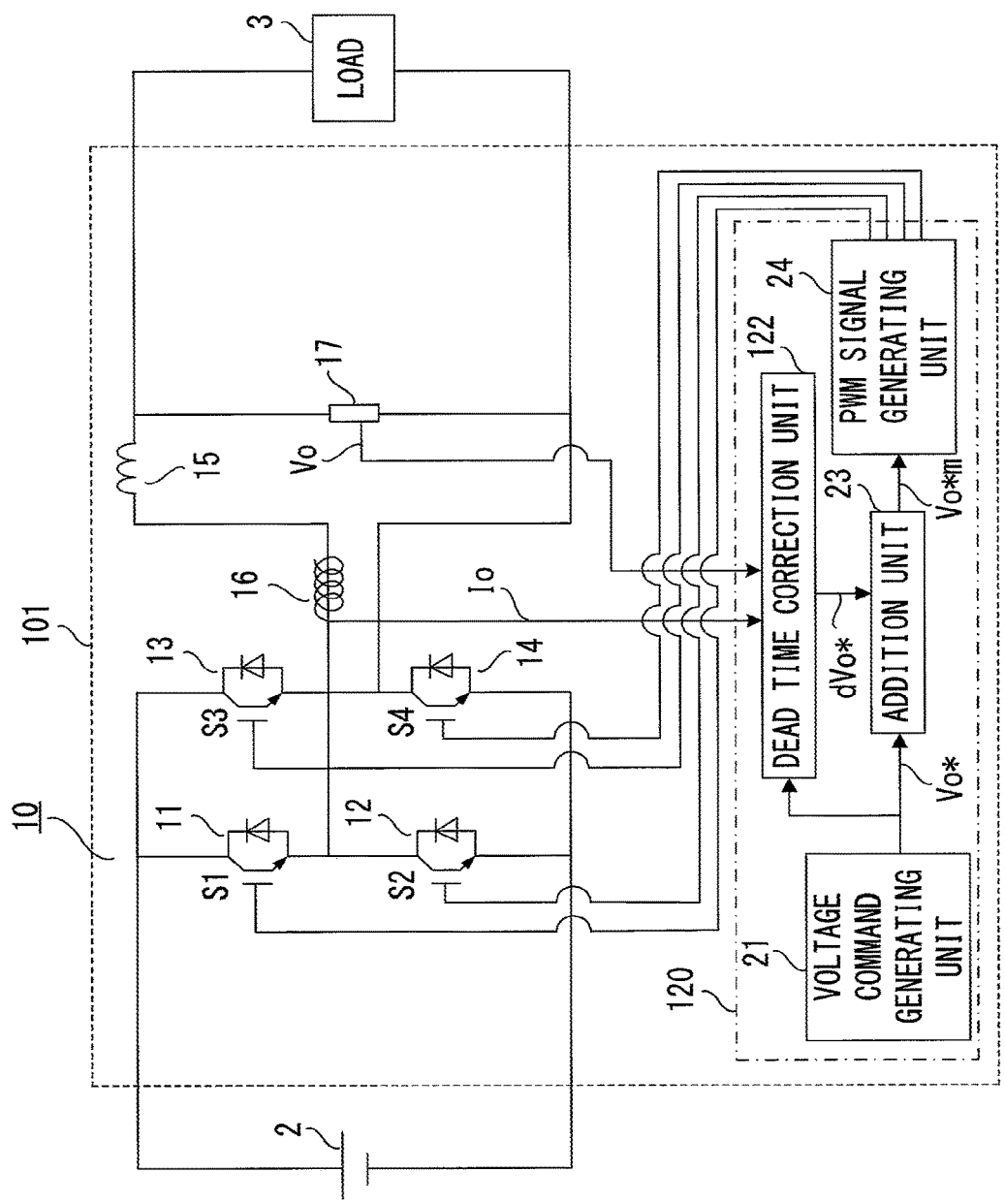
FIG. 14 is a system configuration diagram of a power conversion device according to embodiment 2 of the present invention.

Hereinafter, the configuration and operation of the power conversion device of embodiment 2 will be described, focusing on a difference from embodiment 1, with reference to FIG. 14 which is a system configuration diagram including the power conversion device, FIG. 15 which shows the waveform of the output voltage and the waveform of the output current change amount in the dead time period, FIG. 16 which is a configuration diagram of a dead time correction unit, FIG. 17 which is a flowchart for calculating the dead time correction amount, and FIG. 18 which is a control flowchart. In FIG. 14, the components that are the same as or correspond to those in FIG. 1 are denoted by the same reference characters. In addition, figures in embodiment 1 will be referred to as necessary in the description of embodiment 2.

A difference between the configuration of the power conversion device of embodiment 1 and the configuration of the power conversion device of embodiment 2 is a dead time correction unit 122 of a control unit 120.

FIG. 14 shows the entire system configuration including the power conversion device 101 according to embodiment 2 of the present invention. The entire system is composed of the power conversion device 101, the DC power supply 2, and the AC load 3.

The power conversion device 101 is composed of the power conversion unit 10 and the control unit 120.

The control unit 120 is composed of the voltage command generating unit 21, the dead time correction unit 122, the addition unit 23, and the PWM signal generating unit 24.

The operation of the control unit 120 of the power conversion device 101 will be described. A voltage command Vo* generated by the voltage command generating unit 21 and a dead time correction amount dVo* generated by the dead time correction unit 122 are added by the addition unit 23, to generate a dead-time-corrected voltage command Vo*m, and the dead-time-corrected voltage command Vo*m is outputted to the PWM signal generating unit 24. The PWM signal generating unit 24 generates switching signals S1 to S4 according to the dead time correction amount Vo*m. Then, the switching elements 11 to 14 are turned on or off in accordance with the signals S1 to S4, whereby voltage according to the voltage command Vo* is outputted from the power conversion device 101.

Figure 15:
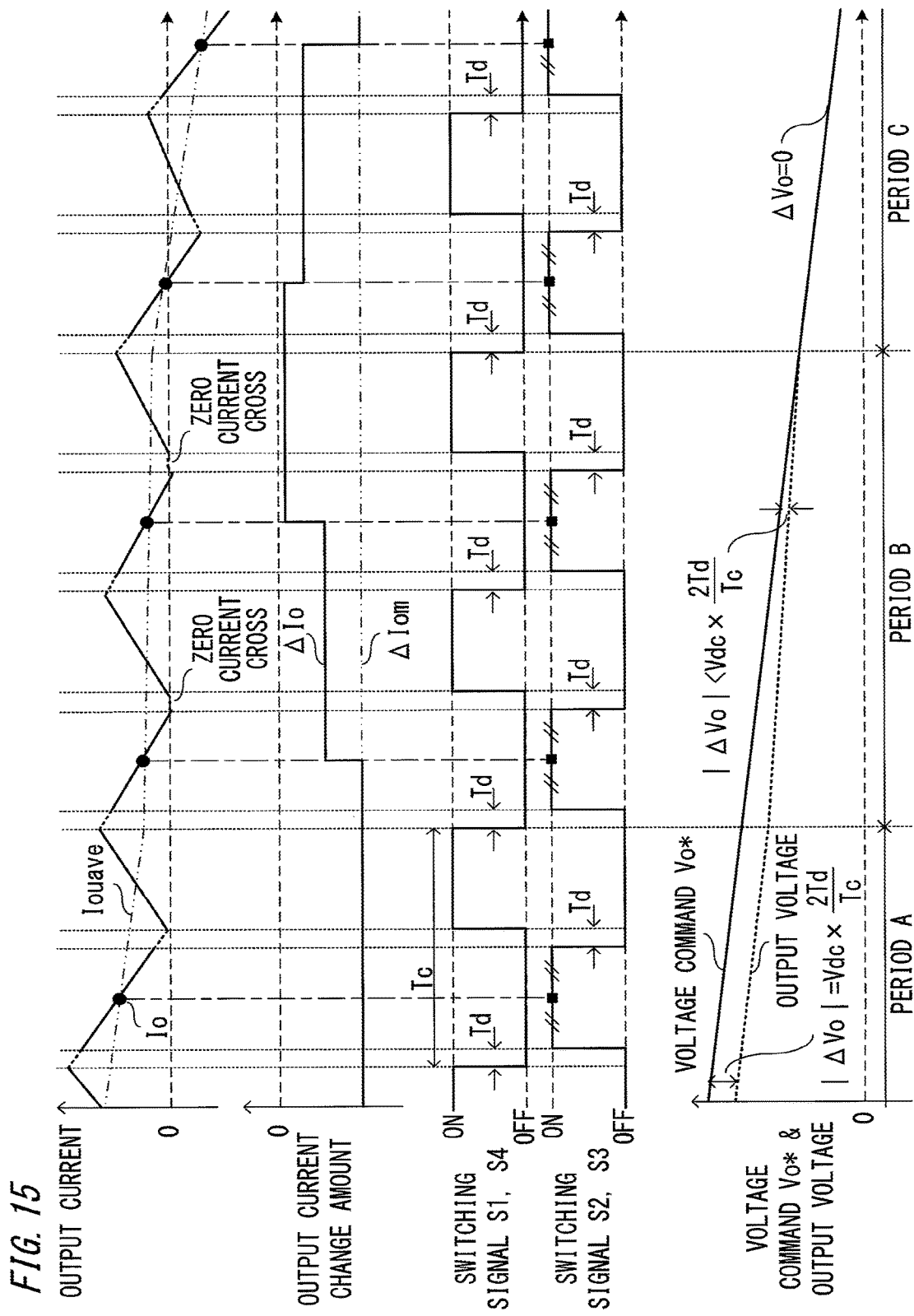
FIG. 15 shows the waveform of output voltage and the waveform of an output current change amount in a dead time period in the power conversion device according to embodiment 2 of the present invention.

FIG. 15 shows examples of the waveform of the output voltage and the waveform of the output current change amount in the power conversion device 101.

In FIG. 15, Td denotes the dead time period, Tc denotes the carrier cycle of the triangular wave generating device 31, Vo denotes the output voltage, Vdc denotes the output voltage of the DC power supply 2, Vo* denotes the voltage command, ΔVo denotes error voltage between the voltage command and the output voltage, Io denotes the measured output current, Iouave denotes average output current, ΔIo denotes the output current change amount, and ΔIom denotes the output current change amount in the case of not providing the dead time period (case of ideal switching). For the purpose of simplification, the output current change amount ΔIo is considered to be the difference between the previous measured output current value and the latest measured output current value. In FIG. 15, the measured output current Io is a value measured at the center of the period in which the switching signals S2 and S3 are ON signals.

In the range in which the output current is sufficiently greater than 0 A (period A in FIG. 15), the output current change amount ΔIo is equal to the output current change amount ΔIom in the case of not providing the dead time period, and the error voltage ΔVo between the output voltage and the voltage command Vo* is a constant value. However, in the vicinity of the part where the output current undergoes zero current cross (period B in FIG. 15), the output current change amount ΔIo temporarily changes to the vicinity of 0 A and the error voltage ΔVo becomes small.

In the vicinity of the part where the average output current Iouave undergoes zero current cross (period C in FIG. 15), the output current change amount ΔIo is equal to the output current change amount ΔIom in the case of not providing the dead time period, and the error voltage ΔVo becomes 0V. Therefore, in embodiment 2 of the present invention, the dead time correction amount dVo* is calculated from the output current change amount ΔIo, whereby the error voltage ΔVo due to the dead time period is corrected to 0V.

Figure 16:
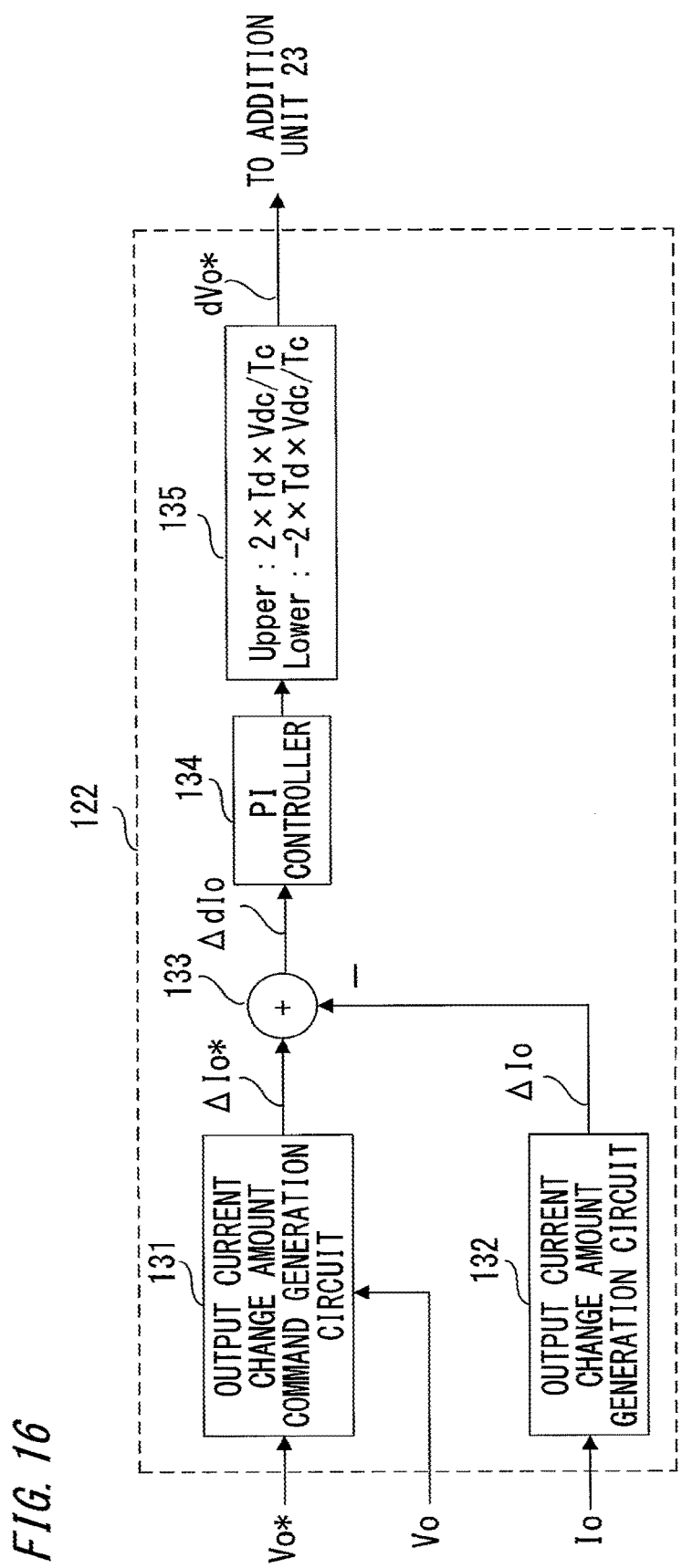
FIG. 16 is a configuration diagram of a dead time correction unit in the power conversion device according to embodiment 2 of the present invention.

FIG. 16 shows the configuration of the dead time correction unit 122 according to embodiment 2. The dead time correction unit 122 is composed of an output current change amount command generation circuit 131, an output current change amount generation circuit 132, a subtractor 133, a PI controller 134, and a controller limiter 135.

Here, Vo* denotes a voltage command generated by the voltage command generating unit 21, Vo denotes measured output voltage, Io denotes measured output current, ΔIo* denotes an output current change amount command, ΔIo denotes an output current change amount, dVo* denotes a dead time correction amount, and ΔdIo denotes an output current change amount error.

The output current change amount command generation circuit 131 estimates the voltage VL of the reactor 15 from the voltage command Vo* and the measured output voltage Vo (reactor voltage VL=voltage command Vo*−measured output voltage Vo). Further, the output current change amount command generation circuit 131 generates the output current change amount command ΔIo* (corresponding to ΔIom in FIG. 11) using the estimated reactor voltage VL and the inductance L of the reactor 15.

Specifically, from Ldi/dt=(Vo*−Vo), the output current change amount command ΔIo* is represented by expression (12), using Δt as a calculation cycle.

$$\Delta Io^* = (\Delta t \times (Vo^* - Vo))/L \quad (12)$$

The output current change amount generation circuit 132 outputs the output current change amount ΔIo from the measured output current Io. As an example of calculation of the output current change amount ΔIo from the measured output current Io, the output current change amount ΔIo may be calculated from the difference between the previous measured output current value and the latest measured output current. Alternatively, the output current change amount may be calculated using the past several measured output currents.

From the output current change amount command ΔIo* generated by the output current change amount command generation circuit 131, and the output current change amount ΔIo outputted from the output current change amount generation circuit 132, the output current change amount error ΔdIo is calculated by the subtractor 133, as represented by expression (13).

$$\Delta dIo = \Delta Io^* - \Delta Io \quad (13)$$

The calculated output current change amount error ΔdIo is inputted to the PI controller 134, whereby the dead time correction amount dVo* according to the output current change amount error ΔdIo is outputted from the PI controller 134. The output of the PI controller 134 is limited by the controller limiter 135, and then outputted from the dead time correction unit 122.

The dead time correction amount dVo* outputted from the dead time correction unit 122 is added to the output voltage command Vo* by the addition unit 23. The output current change amount command ΔIo* corresponds to the output current change amount ΔIom in the case of not providing the dead time period as described in FIG. 15.

Therefore, by the PI controller 134 outputting the dead time correction amount dVo* so that the output current change amount command ΔIo* and the output current change amount ΔIo coincide with each other (the output current change amount error ΔdIo becomes 0), the output current change amount ΔIo becomes the output current change amount ΔIom in the case of not providing the dead time period.

In this case, the output voltage of the power conversion device 101 also coincides with that in the case of not providing the dead time period, and therefore improvement is also made on change in the output voltage due to the dead time period. Using the voltage Vdc of the DC power supply 2 and the carrier cycle Tc of the triangular wave generating device 31 as shown in FIG. 15, change in the output voltage due to the dead time period is −2×Vdc×Td/Tc to 2×Vdc×Td/Tc. Therefore, the controller limiter 135 limits the output of the PI controller 134 in a range of −2×Vdc×Td/Tc to 2×Vdc×Td/Tc.

Figure 17:
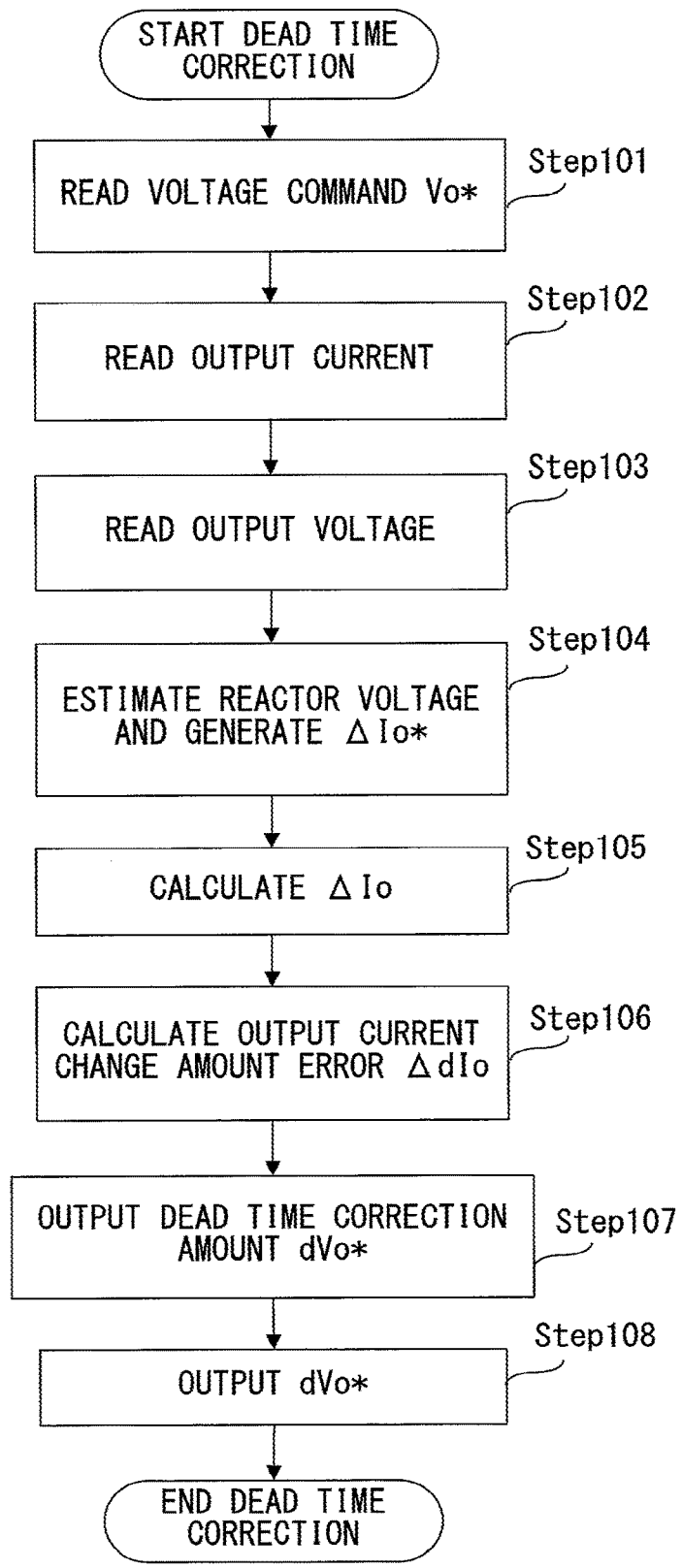
FIG. 17 is a flowchart for calculating a dead time correction amount in the power conversion device according to embodiment 2 of the present invention.

FIG. 17 is a flow for calculating the dead time correction amount dVo* in the dead time correction unit 122, according to embodiment 2 of the present invention.

Hereinafter, with reference to FIG. 17, the process for calculating the dead time correction amount dVo* in the dead time correction unit 122 will be described.

In Step 101 to Step 103, the voltage command Vo*, the output current Io, and the output voltage Vo are read.

In Step 104, the reactor voltage VL is estimated (reactor voltage VL=voltage command Vo*−measured output voltage Vo), and the output current change amount command generation circuit 131 generates the output current change amount command ΔIo*.

In Step 105, the output current change amount generation circuit 132 calculates the output current change amount ΔIo from the measured output current Io.

In Step 106, the subtractor 133 subtracts the output current change amount ΔIo outputted from the output current change amount generation circuit 132, from the output current change amount command ΔIo* outputted from the output current change amount command generation circuit 131, thereby calculating the output current change amount error ΔdIo.

In Step 107, the PI controller 134 receives the output current change amount error ΔdIo and outputs the dead time correction amount dVo* according to the output current change amount error ΔdIo.

In Step 108, the dead time correction amount dVo* outputted from the PI controller 134 is outputted to the addition unit 23.

Through the above process, the dead time correction amount dVo* is added to the voltage command Vo* by the addition unit 23, whereby voltage influence of the output voltage due to the dead time period is reduced.

Figure 18:
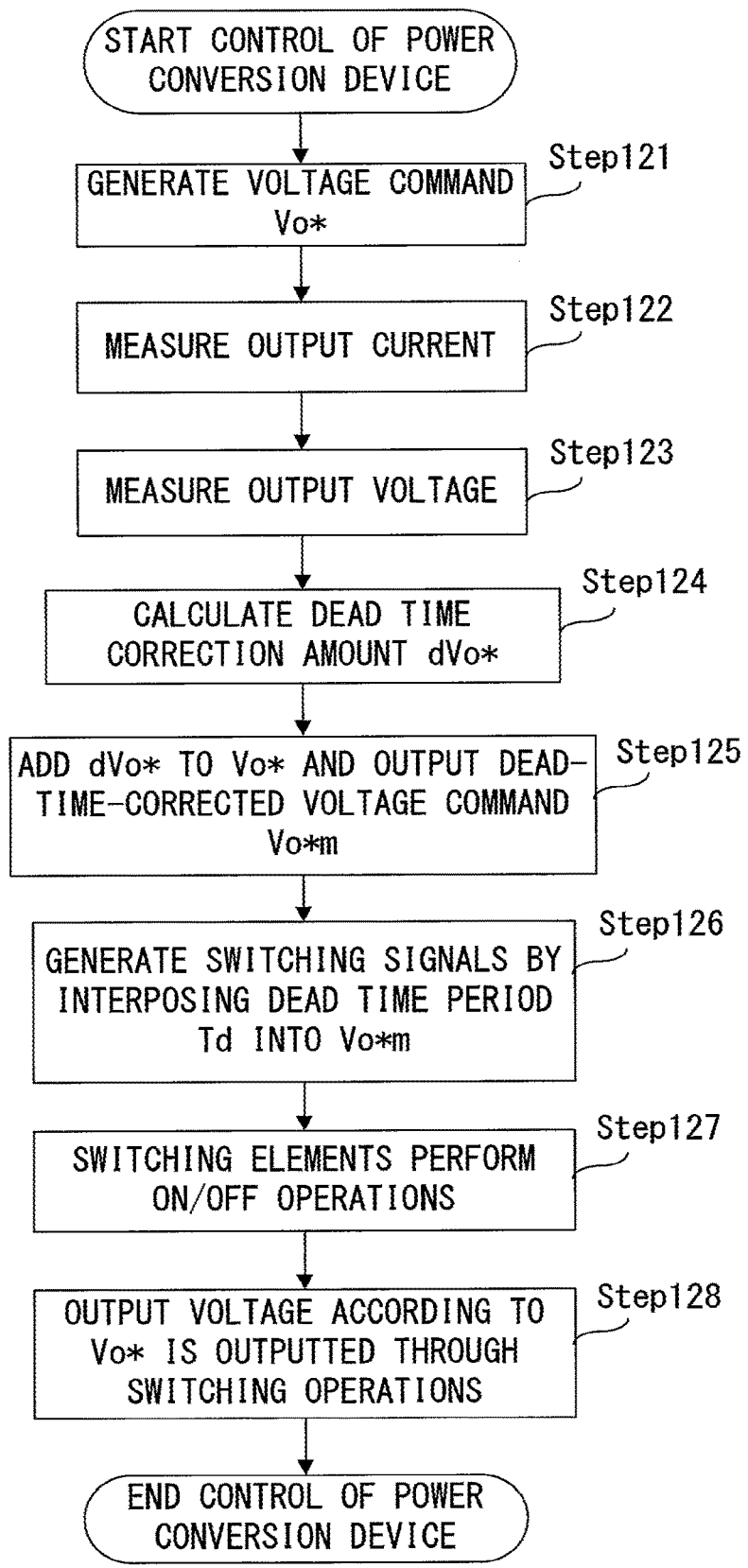
FIG. 18 is a control flowchart in the power conversion device according to embodiment 2 of the present invention.

FIG. 18 shows a control flow in the power conversion device 101 according to embodiment 2 of the present invention.

Hereinafter, with reference to FIG. 18, the control process until the power conversion device 101 outputs the output voltage according to the voltage command Vo* will be described.

In Step 121, the voltage command generating unit 21 generates the voltage command.

In Step 122, the output current measurement unit 16 measures the output current.

In Step 123, the output voltage measurement unit 17 measures the output voltage.

In Step 124, the dead time correction amount dVo* according to the output current change amount ΔIo is calculated in accordance with the flowchart until the dead time correction amount dVo* is calculated in the dead time correction unit 122 as shown in FIG. 17.

In Step 125, the addition unit 23 adds the voltage command Vo* and the dead time correction amount dVo*, to output the dead-time-corrected voltage command Vo*m.

In Step 126, the PWM signal generating unit 24 generates switching signals by interposing the dead time period into Vo*m.

In Step 127, the switching elements 11 to 14 perform ON/OFF operations in accordance with the switching signals.

In Step 128, the power conversion device 101 outputs, through the reactor 15, output voltage according to Vo* through the switching operations on the basis of the output voltage of the DC power supply 2.

In embodiment 2 of the present invention, the same effect as in the waveform shown in FIG. 13 in embodiment 1 of the present invention is obtained.

As described in FIG. 13, if the load increases, the output current increases. If the output current increases, the timing of change in the output current in the vicinity of zero current cross of the output current is changed. Therefore, the timing of occurrence of error voltage due to the dead time period is also changed.

By applying the invention of the present embodiment 2, it is possible to instantaneously perform proper dead time correction even if the output current changes. Thus, it is possible to instantaneously calculate the dead time correction amount even in the case where the output current changes due to change in power consumption in the load or the like or in the case where the load is a capacitor-input load having nonlinear characteristics.

Therefore, since there is no possibility that the output voltage becomes overvoltage due to erroneous dead time correction and the output current becomes overcurrent, the reactor at the output part of the power conversion device can be downsized.

In addition, in the autonomous operation that is not interconnected with a power grid, in the case where the distributed power supply having an isolated operation detection unit, and the power conversion device are interconnected with each other, it is possible to prevent occurrence of voltage change due to dead time in the vicinity of zero cross of the output voltage, and suppress change in the frequency. Thus, it becomes possible to prevent the distributed power supply from detecting isolated operation on the basis of frequency change due to the dead time.

Further, the functions of the control unit 120 such as the dead time correction unit 122 can be implemented by S/W, and in the case of using S/W, it is possible to decrease the number of components of H/W and downsize the power conversion device.

In the actual devices, there are variations in the dead time periods and variations in the circuit constants. However, since the dead time correction amount dVo* is calculated using a controller, an effect of enabling the dead time correction amount dVo* to be calculated in accordance with variations in the dead time periods and variations in the circuit constants, is also obtained.

In embodiment 2, the reactor voltage is estimated (Vo*−Vo), and the output current change amount is calculated using the estimated reactor voltage. However, without using the estimated reactor voltage, the output current change amount may be calculated using the output voltage, whereby the same effect can be obtained.

As described above, the power conversion device of embodiment 2 calculates the output current change amount using the estimated reactor voltage, and calculates the dead time correction amount from the output current change amount. Therefore, the power conversion device of embodiment 2 can instantaneously calculate the dead time correction amount even in the case where the output current changes due to load change or the like or in the case where the load has nonlinear characteristics. In addition, in the case of performing operation interconnected with the distributed power supply, in the autonomous operation, the distributed power supply can be prevented from erroneously detecting isolated operation on the basis of frequency change due to the dead time. In addition, since the efficiency of the power conversion device is improved, an effect of saving energy is obtained.

Embodiment 3

A power conversion device of embodiment 3 calculates the dead time correction amount using: the zero current cross time of the output current calculated using the estimated reactor voltage as described in embodiment 1; and the output current change amount calculated using the estimated reactor voltage as described in embodiment 2.

Hereinafter, the configuration and operation of the power conversion device of embodiment 3 will be described, focusing on a difference from embodiments 1 and 2, with reference to FIG. 19 which is a system configuration diagram including the power conversion device, FIG. 20 which is a configuration diagram of a dead time correction unit, and FIG. 21 which is a control flowchart.

Figure 20:
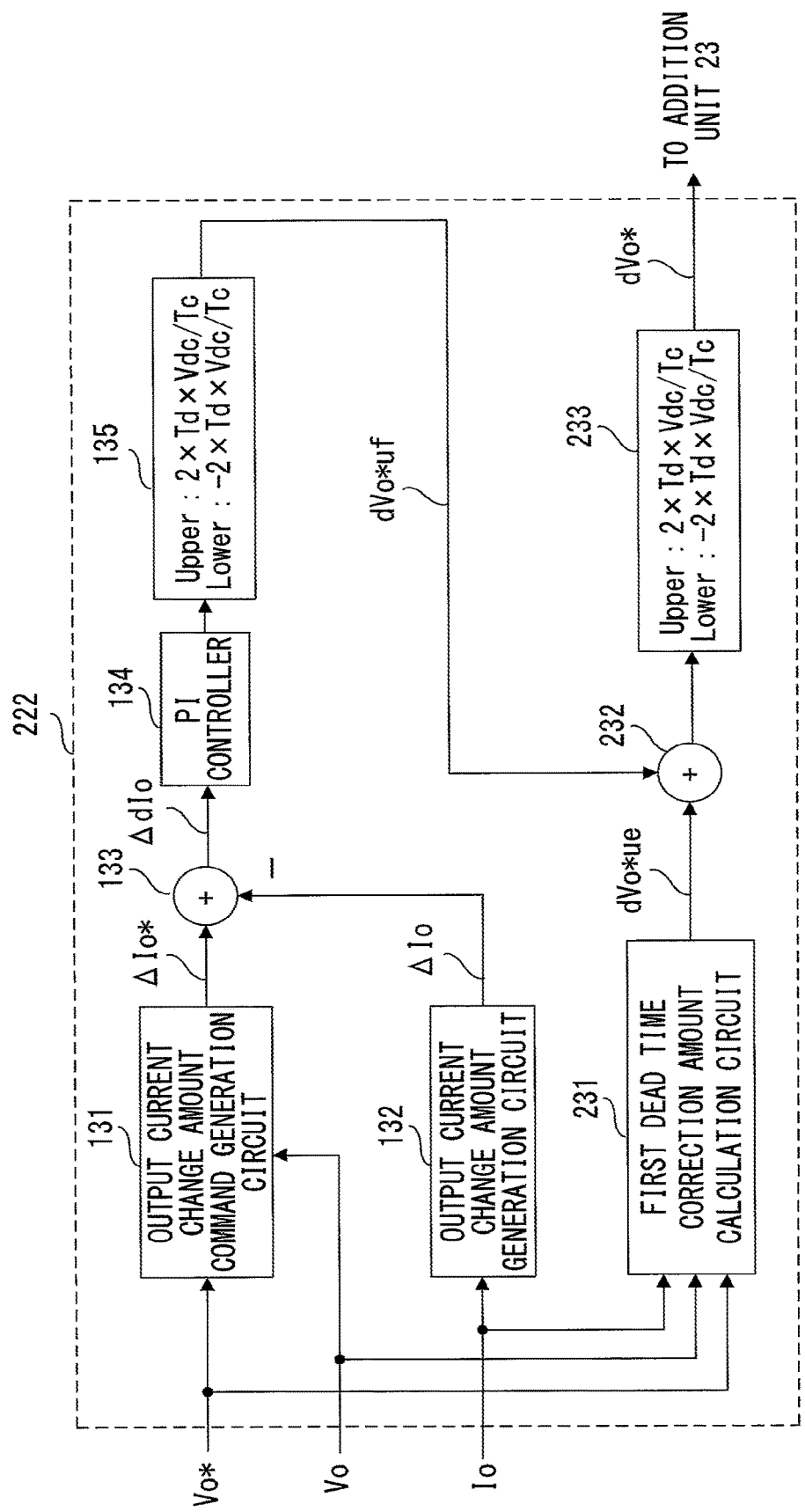
FIG. 20 is a configuration diagram of a dead time correction unit of the power conversion device according to embodiment 3 of the present invention.

In FIG. 20, the components that are the same as or correspond to those in FIG. 1 are denoted by the same reference characters. In addition, figures in embodiments 1 and 2 will be referred to as necessary in the description of embodiment 3.

A difference between the configurations of the power conversion devices of embodiments 1 and 2 and the configuration of the power conversion device of embodiment 3 is a dead time correction unit 222 of a control unit 220.

Figure 19:
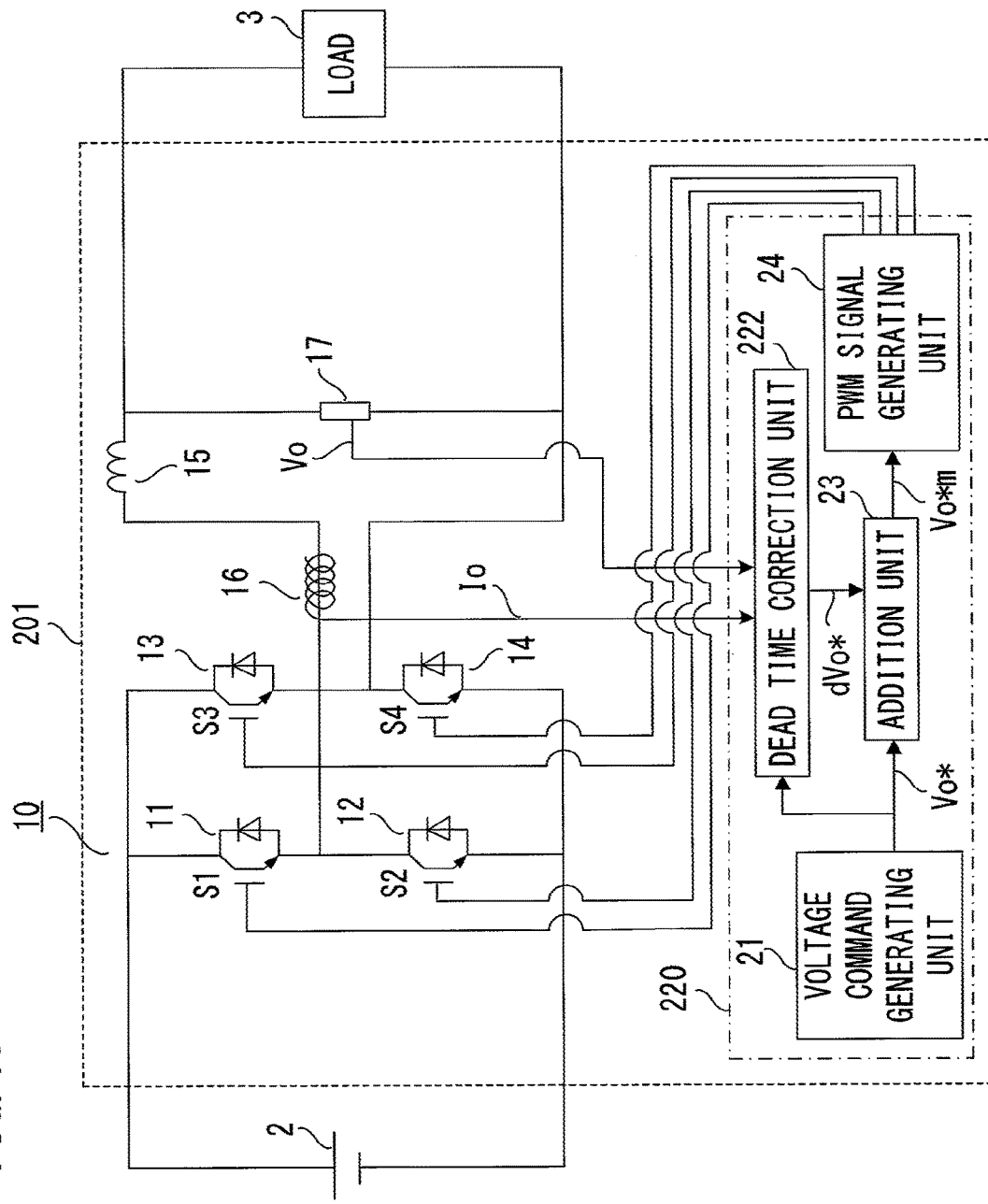
FIG. 19 is a system configuration diagram of a power conversion device according to embodiment 3 of the present invention.

FIG. 19 shows the entire system configuration including the power conversion device 201 according to embodiment 3 of the present invention. The entire system is composed of the power conversion device 201, the DC power supply 2, and the AC load 3.

The power conversion device 201 is composed of the power conversion unit 10 and the control unit 220.

The control unit 220 is composed of the voltage command generating unit 21, the dead time correction unit 222, the addition unit 23, and the PWM signal generating unit 24.

First, the feature of the power conversion device of embodiment 3 will be described.

In calculation of the dead time correction amount using the zero current cross time of the output current as described in embodiment 1, as compared to calculation of the dead time correction amount using the output current change amount as described in embodiment 2, there is no delay due to the PI controller 134 and therefore the dead time correction amount can be calculated earlier. However, in calculation of the dead time correction amount using the zero current cross time of the output current, error is likely to occur in the dead time correction amount, by the influences of error of the assumed dead time period Td and error of the inductance value of the reactor 15.

On the other hand, in calculation of the dead time correction amount using the output current change amount as described in embodiment 2, the calculation of the dead time correction amount is delayed as compared to calculation of the dead time correction amount using the zero current cross time of the output current as described in embodiment 1. However, the influences of error of the assumed dead time period Td and error of the inductance value of the reactor 15 can be reduced by the PI controller 134.

By combining the calculation method for the dead time correction amount using the zero current cross time (embodiment 1) and the calculation method for the dead time correction amount using the output current change amount (embodiment 2), it becomes possible to expedite calculation of the dead time correction amount and reduce the influences of error of the assumed dead time period Td and error of the inductance value of the reactor 15.

The operation of the control unit 220 of the power conversion device 201 will be described. A voltage command Vo* generated by the voltage command generating unit 21 and a dead time correction amount dVo* generated by the dead time correction unit 222 are added by the addition unit 23, to generate a dead-time-corrected voltage command Vo*m, and the dead-time-corrected voltage command Vo*m is outputted to the PWM signal generating unit 24. The PWM signal generating unit 24 generates switching signals S1 to S4 according to Vo*m. Then, the switching elements 11 to 14 are turned on or off in accordance with the signals S1 to S4, whereby voltage according to the voltage command Vo* is outputted from the power conversion device 201.

FIG. 20 shows the configuration of the dead time correction unit 222 according to embodiment 3 of the present invention. The dead time correction unit 222 is composed of the output current change amount command generation circuit 131, the output current change amount generation circuit 132, the subtractor 133, the PI controller 134, the controller limiter 135, a first dead time correction amount calculation circuit 231, an adder 232, and a controller limiter 233.

Here, Vo* denotes a voltage command generated by the voltage command generating unit 21, Vo denotes measured output voltage, Io denotes measured output current, ΔIo* denotes an output current change amount command, ΔIo denotes an output current change amount, dVo*ue denotes a dead time correction amount in the case of using a zero current cross time, dVo*uf denotes a dead time correction amount in the case of using an output current change amount, dVo* denotes a dead time correction amount, and ΔdIo denotes an output current change amount error.

As for the dead time correction amount dVo*ue in the case of using the zero current cross time, the dead time correction amount is calculated in the same manner as in FIG. 10 and FIG. 11 in embodiment 1, and as for the dead time correction amount dVo*uf in the case of using the output current change amount, the dead time correction amount is calculated in the same manner as in FIG. 16 in embodiment 2. Therefore, the description thereof is omitted.

The dead time correction amount dVo*ue in the case of using the zero current cross time and the dead time correction amount dVo*uf in the case of using the output current change amount ΔIo are added by the adder 232. The output of the adder 232 is limited by the controller limiter 135, and then is added to the output voltage command Vo* by the addition unit 23.

Figure 21:
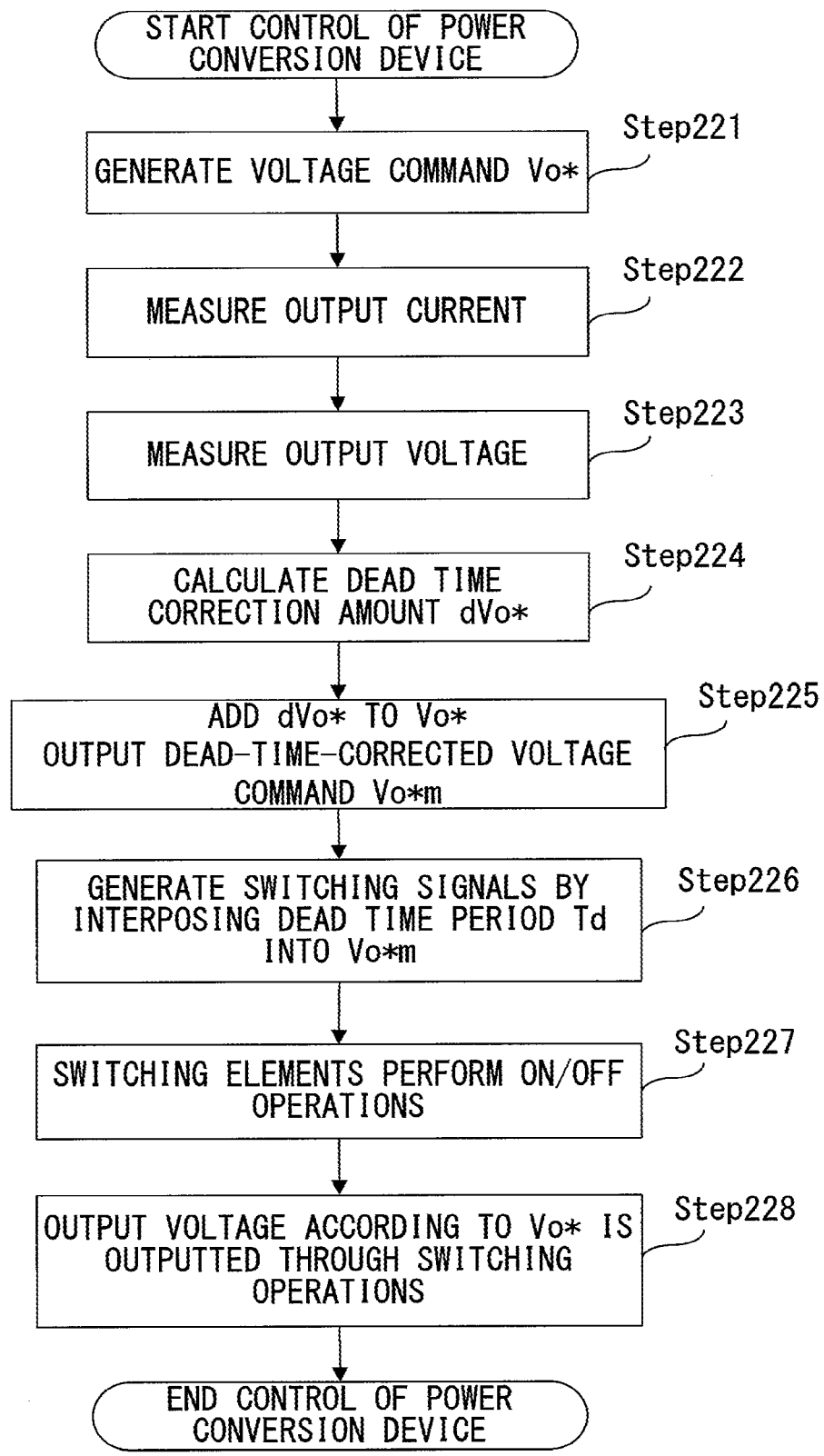
FIG. 21 is a control flowchart in the power conversion device according to embodiment 3 of the present invention.

FIG. 21 shows a control flow in the power conversion device 201 according to embodiment 3 of the present invention.

Hereinafter, the control process until the power conversion device 201 outputs the output voltage according to the voltage command Vo* will be described.

In Step 221, the voltage command generating unit 21 generates the voltage command.

In Step 222, the output current measurement unit 16 measures the output current.

In Step 223, the output voltage measurement unit 17 measures the output voltage.

In Step 224, the dead time correction amount dVo* according to the output current change amount ΔIo is calculated in accordance with the flow until the dead time correction amount dVo* is calculated in the dead time correction unit 122 as shown in FIG. 17.

In Step 225, the addition unit 23 adds the voltage command Vo* and the dead time correction amount dVo*, to output the dead-time-corrected voltage command Vo*m.

In Step 226, the PWM signal generating unit 24 generates switching signals by interposing the dead time period into Vo*m.

In Step 227, the switching elements 11 to 14 perform ON/OFF operations in accordance with the switching signals.

In Step 228, the power conversion device 201 outputs, through the reactor 15, output voltage according to Vo* through the switching operations on the basis of the output voltage of the DC power supply 2.

In embodiment 3 of the present invention, the same effect as in the waveform shown in FIG. 13 in embodiment 1 of the present invention is obtained.

As described in FIG. 13, if the load increases, the output current increases. If the output current increases, the timing of change in the output current in the vicinity of zero current cross of the output current is changed. Therefore, the timing of occurrence of error voltage due to the dead time period is also changed.

By applying the invention of the present embodiment 3, it is possible to instantaneously perform proper dead time correction even if the output current changes. Thus, it is possible to instantaneously calculate the dead time correction amount even in the case where the output current changes due to change in power consumption in the load or the like or in the case where the load is a capacitor-input load having nonlinear characteristics.

Therefore, since there is no possibility that the output voltage becomes overvoltage due to erroneous dead time correction and the output current becomes overcurrent, the reactor at the output part of the power conversion device can be downsized.

In addition, in the autonomous operation that is not interconnected with a power grid, in the case where the distributed power supply having an isolated operation detection unit, and the power conversion device are interconnected with each other, it is possible to prevent occurrence of voltage change due to dead time in the vicinity of zero cross of the output voltage, and suppress change in the frequency. Thus, it becomes possible to prevent the distributed power supply from detecting isolated operation on the basis of frequency change due to the dead time.

Further, the functions of the control unit 220 such as the dead time correction unit 222 can be implemented by S/W, and in the case of using S/W, it is possible to decrease the number of components of H/W and downsize the power conversion device.

In the actual devices, there are variations in the dead time periods and variations in the circuit constants. However, since the dead time correction amount dVo* is calculated using a controller, an effect of enabling the dead time correction amount dVo* to be calculated in accordance with variations in the dead time periods and variations in the circuit constants, is also obtained.

As described above, the power conversion device of embodiment 3 calculates the dead time correction amount using: the zero current cross time of the output current calculated using the estimated reactor voltage; and the output current change amount calculated using the estimated reactor voltage. Therefore, the power conversion device of embodiment 3 can instantaneously calculate the dead time correction amount even in the case where the output current changes due to load change or the like or in the case where the load has nonlinear characteristics. In addition, in the case of performing operation interconnected with the distributed power supply, in the autonomous operation, the distributed power supply can be prevented from erroneously detecting isolated operation on the basis of frequency change due to the dead time.

Embodiment 4

A power conversion device of embodiment 4 is obtained by further adding a DC voltage control unit for suppressing DC voltage contained in the output voltage (controlling the DC voltage to 0V), to the power conversion devices of embodiments 1 to 3.

Hereinafter, the configuration and operation of the power conversion device of embodiment 4 will be described, focusing on a difference from embodiments 1 to 3, with reference to FIG. 22 which is a system configuration diagram including the power conversion device, and FIG. 23 which illustrates the effect of dead time correction.

Figure 22:
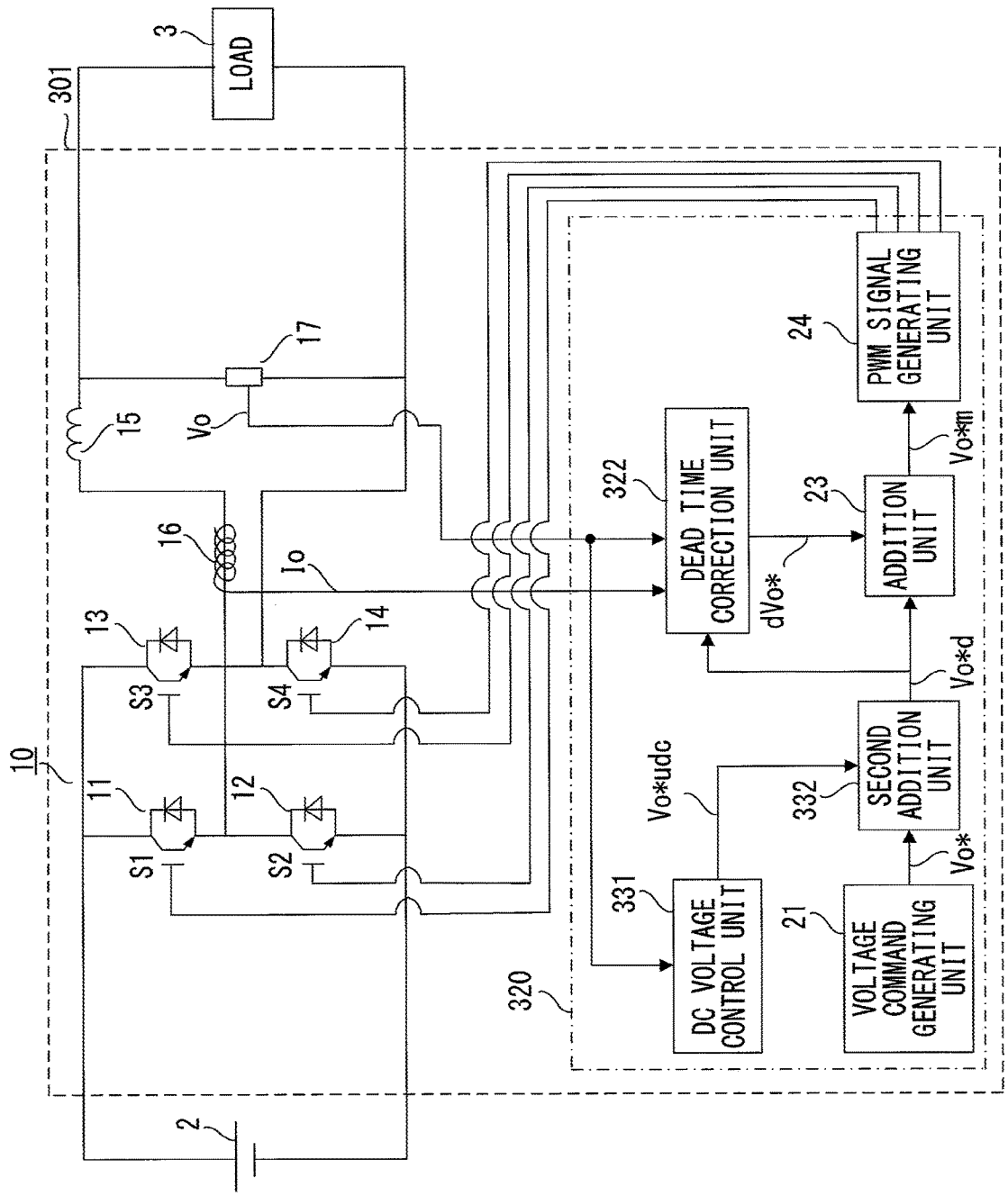
FIG. 22 is a system configuration diagram of a power conversion device according to embodiment 4 of the present invention.

In FIG. 22, the components that are the same as or correspond to those in FIG. 1 are denoted by the same reference characters. In addition, figures in embodiments 1 and 2 will be referred to as necessary in the description of embodiment 3.

First, the necessity of suppression of DC voltage contained in the output voltage will be described.

If dead time correction is not properly performed, voltage distortion asymmetric between positive and negative occurs in the output voltage of the power conversion device. Therefore, average voltage in one cycle of the output voltage is not 0V, and DC voltage is superimposed on the output voltage. If DC voltage is superimposed on the output voltage, in the case where an inductive load composed of a reactor is connected to the power conversion device, the magnetic flux of the reactor changes in a biased manner and the reactor is saturated. If the reactor is saturated, the load impedance decreases, whereby overcurrent occurs in the power conversion device.

One of measures therefor is to add, to the voltage command, a voltage command for suppressing DC voltage. In embodiment 4 of the present invention, the dead time correction amount in the case of adding, to the voltage command, a voltage command from the DC voltage control unit, is calculated.

A difference between the configurations of the power conversion devices of embodiments 1 to 3 and the configuration of the power conversion device of embodiment 4 is that a DC voltage control unit 331 is added to the control unit 220.

FIG. 22 shows the entire system configuration including the power conversion device 301 according to embodiment 4 of the present invention. The entire system is composed of the power conversion device 301, the DC power supply 2, and the AC load 3.

The power conversion device 301 is composed of the power conversion unit 10 and a control unit 320.

The control unit 320 is composed of the voltage command generating unit 21, a dead time correction unit 322, the addition unit 23, the PWM signal generating unit 24, the DC voltage control unit 331, and a second addition unit 323.

The dead time correction unit 322 may be any of the dead time correction units 22, 122, and 222 shown in embodiment 1 to 3.

The DC voltage control unit 331 calculates the average in one cycle of the output voltage Vo of the power conversion device 301, to measure the DC voltage component Voudc of the output voltage Vo. Then, the DC voltage control unit 331 calculates a DC voltage command Vo*udc so that the measured DC voltage component Voudc becomes 0V.

The specific output waveform of the DC voltage command Vo*udc may be a step waveform or a full-wave-rectified waveform, and is set such that the DC voltage component of the waveform is equal to Vo*udc.

The control unit 320 of the power conversion device adds, by the addition unit 332, the voltage command Vo* generated by the voltage command generating unit 21, and the DC voltage command Vo*udc from the DC voltage control unit 331 for controlling the DC voltage superimposed on the output voltage to be 0V, to generate the voltage command Vo*d.

The dead time correction amount dVo* generated by the dead time correction unit 322 is added to the voltage command Vo*d by the addition unit 23, to generate a dead-time-corrected voltage command Vo*m, and the dead-time-corrected voltage command Vo*m is outputted to the PWM signal generating unit 24. The PWM signal generating unit 24 generates switching signals S1 to S4 according to the dead-time-corrected voltage command Vo*m. Then, the switching elements 11 to 14 are turned on or off in accordance with the signals S1 to S4, whereby voltage according to the voltage command Vo* is outputted from the power conversion device 301.

Figure 23:
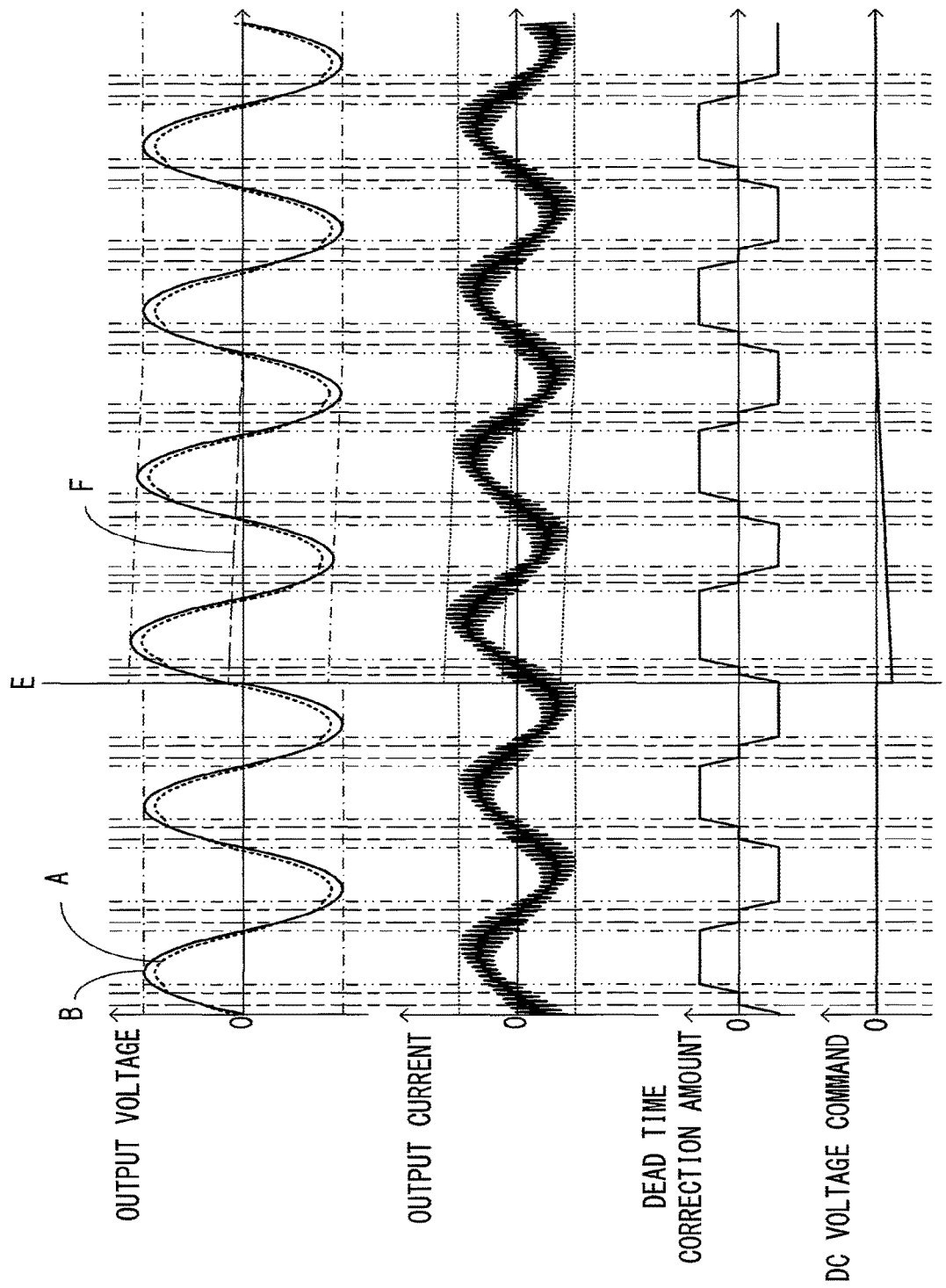
FIG. 23 illustrates the effect of dead time correction in the power conversion device according to embodiment 4 of the present invention.

FIG. 23 shows an example of the effect of dead time correction in the case of suppressing DC voltage, according to embodiment 4 of the present invention. With reference to FIG. 23, the effect of DC-voltage-suppressed dead time correction according to embodiment 4 of the present invention will be described.

FIG. 23 shows a waveform example in which DC voltage is superimposed with an inductive load connected to the power conversion device 301 and the DC voltage command Vo*udc from the DC voltage control unit 331 varies so that the superimposed DC voltage becomes 0V.

In FIG. 23, an output voltage waveform (dotted line) A indicates the case of not performing correction, and an output voltage waveform (solid line) B indicates the case of performing correction. In addition, E indicates a time point at which the DC voltage is superimposed. Dotted-dashed line F indicates change in the DC voltage.

In FIG. 23, by the superimposition of the DC voltage (point E), the timing of change in the output current in the vicinity of zero current cross of the output current is changed, and thus the timing of occurrence of error voltage due to the dead time period is changed.

By applying the invention of the present embodiment 4, it is possible to instantaneously perform proper dead time correction even if the output current changes due to the superimposition of DC voltage. Therefore, even in the case where the DC voltage command Vo*udc from the DC voltage control unit 301 is added to the voltage command Vo* from the voltage command generating unit 21, proper dead time correction can be performed instantaneously, and thus the same effect as in embodiments 1 to 3 can be obtained.

As described above, the power conversion device of embodiment 4 is obtained by further adding the DC voltage control unit for suppressing DC voltage contained in the output voltage, to the power conversion devices of embodiments 1 to 3. Therefore, as in the power conversion devices of embodiments 1 to 3, the power conversion device of embodiment 4 can instantaneously calculate the dead time correction amount even in the case where the output current changes due to load change or the like or in the case where the load has nonlinear characteristics. In addition, in the case of performing operation interconnected with the distributed power supply, in the autonomous operation, the distributed power supply can be prevented from erroneously detecting isolated operation on the basis of frequency change due to the dead time. Further, DC voltage contained in the output voltage can be suppressed.

Embodiment 5

A power conversion device of embodiment 5 is obtained by interconnecting the power conversion devices of embodiments 1 to 4 with a power grid or a distributed power supply. In addition, modifications of embodiments 1 to 4 will be also described.

Figure 24:
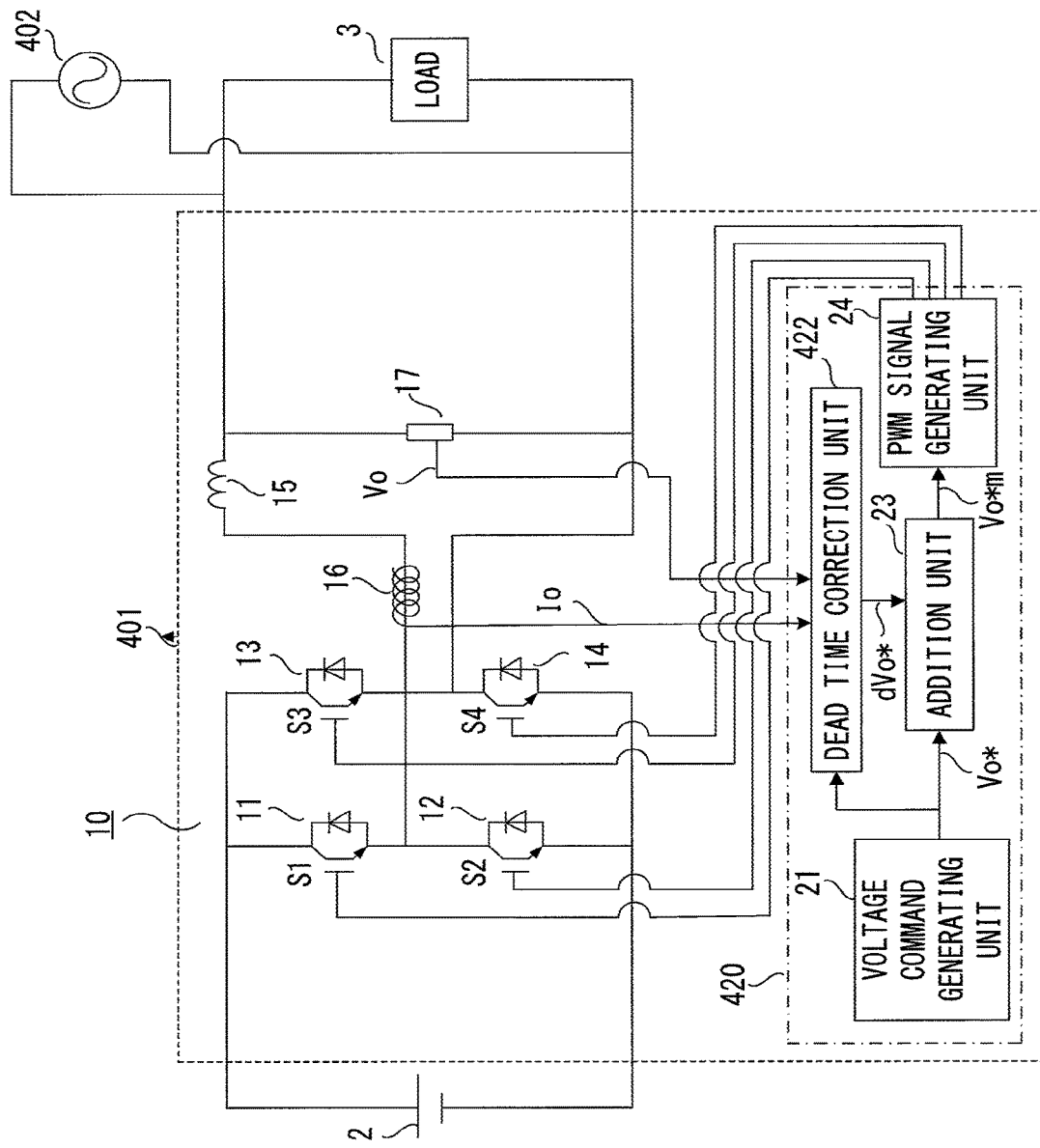
FIG. 24 is a system configuration diagram of a power conversion device according to embodiment 5 of the present invention.

Hereinafter, the configuration and operation of the power conversion device of embodiment 5 will be described, focusing on a difference from embodiments 1 to 4, with reference to FIG. 24 which is a system configuration diagram including the power conversion device. In FIG. 24, the components that are the same as or correspond to those in FIG. 1 are denoted by the same reference characters.

In embodiments 1 to 4, the power conversion devices 1, 101, 201, 301 supply power to the AC load 3, but are not limited thereto.

FIG. 24 shows the system configuration in the case where the power conversion device 401 is interconnected with a power grid or distributed power supply (photovoltaic generation, wind power generation, fuel battery, etc.) 402.

A dead time correction unit 422 of a control unit 420 may be any of the dead time correction units 22, 122, 222, and 322 shown in embodiments 1 to 4.

As shown in FIG. 24, even in the system in which the power conversion device 401 is interconnected with the power grid or distributed power supply 402 and performs charge operation as well as discharge operation (a power conversion device capable of transferring power in a bidirectional manner), the same effect can be obtained.

In the power conversion devices 1, 101, 201, 301, and 401, dead time correction for the voltage command has been described. Even in the case of using a pulse width ratio of the PWM signal generating unit 24 in which the output voltage command is standardized with the output voltage of the DC power supply 2, the same effect can be obtained by standardizing, in the same manner, the dead time correction amount outputted from the dead time correction unit 22, 122, 222, and 322.

As for the measurement method for the output current, it is sufficient to know the measurement position of the current. In the dead time correction method using the zero current cross time (embodiments 1, 3, 4), the same calculation can be performed by adjusting the calculation of Ion and Iop in Step 4 in FIG. 10 and FIG. 11. In the dead time correction method using the output current change amount (embodiments 2, 3, 4), the same calculation can be performed by adjusting the calculation of ΔIo in Step 105 in FIG. 17.

In embodiments 1 to 4, the DC power supply 2 is a constant voltage source. However, without limitation thereto, DC voltage outputted from a device (DC/AC conversion device or DC/DC conversion device) for converting AC voltage or DC voltage to DC voltage may be used.

A DC power supply output voltage measurement unit for measuring the output voltage Vdc of the DC power supply 2 may be added and the measured Vdc may be used for calculating the dead time correction amount in embodiments 1 to 4.

In embodiments 1 and 2, for simplification of the description, the case where the dead time correction units 22 and 122 are configured as H/W has been described. However, without limitation thereto, all or some of the circuits in the dead time correction unit may be implemented by a central processing unit (CPU) and configured as S/W operating on the CPU, whereby the same effect can be obtained. The functions of the circuits may be divided into S/W and H/W, to achieve the same functions.

The dead time is changed by influences such as delay of turning on or delay of turning off of the switching elements 11 to 14. Therefore, coefficient adjustment or addition of a constant term may be performed for the dead time period used for calculation of the dead time correction amount or for the output limiter for the dead time correction amount.

In consideration of voltage change due to the impedance of a circuit or wiring, coefficient adjustment or addition of a constant term may be performed for the dead time period used for the output limiter for the dead time correction amount.

As described above, as in the power conversion devices of embodiments 1 to 4, the power conversion device of embodiment 5 can instantaneously calculate the dead time correction amount even in the case where the output current changes due to load change or the like or in the case where the load has nonlinear characteristics. In addition, in the case of performing operation interconnected with the distributed power supply, in the autonomous operation, the distributed power supply can be prevented from erroneously detecting isolated operation on the basis of frequency change due to the dead time.

It is noted that, within the scope of the present invention, the above embodiments may be freely combined with each other, or each of the above embodiments may be modified or simplified as appropriate.

INDUSTRIAL APPLICABILITY

The present invention relates to a power conversion device having a dead time correction function to eliminate an influence of dead time, and is widely applicable to power conversion devices for converting DC power to AC power.

The invention claimed is:

1. A power conversion device comprising:
power conversion circuitry including: a power conversion circuit which has a switching element and converts DC power of DC power supply to AC power; an output current measurement unit for measuring output current of the power conversion circuit; an output voltage measurement unit for measuring output voltage of the power conversion circuit; and a reactor which, one of terminals of the reactor being connected to an output side of the power conversion circuit, suppresses a harmonic; and
control circuitry including: a voltage command generating unit for generating a voltage command for controlling the switching element; a dead time correction unit for calculating a dead time correction amount for correcting voltage error, between the voltage command and the output voltage, caused due to dead time for preventing short-circuit of the switching element; an addition unit for adding the dead time correction amount to the voltage command; and a PWM signal generating unit for generating a switching signal according to output of the addition unit, wherein
the dead time correction unit estimates reactor voltage from the voltage command, measured output voltage measured by the output voltage measurement unit, and DC output voltage of the DC power supply,
calculates output current value at the time when the switching element changes from ON to OFF from the estimated reactor voltage, a carrier cycle for PWM signal generation of the PWM signal generating unit, and measured output current by the output current measurement unit,
estimates zero current cross time of the output current from the calculated output current value at the time when the switching element changes from ON to OFF and the dead time period, and
calculates the dead time correction amount from the zero current cross time, the calculated output current value at the time when the switching element changes from ON to OFF, the DC output voltage, the carrier cycle, and the dead time period on the assumption that change in the output current is linear with respect to time.

2. The power conversion device according to claim 1, further comprising DC voltage control circuitry for suppressing DC voltage contained in the output voltage, wherein
output of the DC voltage control circuitry is added to the voltage command.

3. The power conversion device according to claim 2, wherein the power conversion device is interconnected with a power grid or a distributed power supply, to supply AC power to a load.

4. The power conversion device according to claim 2, wherein the power conversion device supplies AC power to a load independently of a power grid or a distributed power supply.

5. The power conversion device according to claim 1, wherein the power conversion device is interconnected with a power grid or a distributed power supply, to supply AC power to a load.

6. The power conversion device according to claim 1, wherein the power conversion device supplies AC power to a load independently of a power grid or a distributed power supply.

7. A power conversion device comprising:
power conversion circuitry including: a power conversion circuit which has a switching element and converts DC power to AC power; an output current measurement unit for measuring output current of the power conversion circuit; an output voltage measurement unit for measuring output voltage of the power conversion circuit; and a reactor which, one of terminals of the reactor being connected to an output side of the power conversion circuit, suppresses a harmonic; and
control circuitry including: a voltage command generating unit for generating a voltage command for controlling the switching element; a dead time correction unit for calculating a dead time correction amount for correcting voltage error, between the voltage command and the output voltage, caused due to dead time for preventing short-circuit of the switching element; an addition unit for adding the dead time correction amount to the voltage command; and a PWM signal generating unit for generating a switching signal according to output of the addition unit, wherein
the dead time correction unit estimates reactor voltage from the voltage command, and measured output voltage measured by the output voltage measurement unit, estimates an output current change amount of the output current from the estimated reactor voltage and the measured output current by the output current measurement unit, and
calculates the dead time correction amount on the basis of the estimated output current change amount.

8. The power conversion device according to claim 7, further comprising DC voltage control circuitry for suppressing DC voltage contained in the output voltage, wherein
output of the DC voltage control circuitry is added to the voltage command.

9. The power conversion device according to claim 8, wherein the power conversion device is interconnected with a power grid or a distributed power supply, to supply AC power to a load.

10. The power conversion device according to claim 8, wherein the power conversion device supplies AC power to a load independently of a power grid or a distributed power supply.

11. The power conversion device according to claim 7, wherein the power conversion device is interconnected with a power grid or a distributed power supply, to supply AC power to a load.

12. The power conversion device according to claim 7, wherein the power conversion device supplies AC power to a load independently of a power grid or a distributed power supply.

13. A power conversion device comprising:
power conversion circuitry including: a power conversion circuit which has a switching element and converts DC power of DC power supply to AC power; an output current measurement unit for measuring output current of the power conversion circuit; an output voltage measurement unit for measuring output voltage of the power conversion circuit; and a reactor which, one of terminals of the reactor being connected to an output side of the power conversion circuit, suppresses a harmonic; and control circuitry including: a voltage command generating unit for generating a voltage command for controlling the switching element; a dead time correction unit for calculating a dead time correction amount for correcting voltage error, between the voltage command and the output voltage, caused due to dead time for preventing short-circuit of the switching element; an addition unit for adding the dead time correction amount to the voltage command; and a PWM signal generating unit for generating a switching signal according to output of the addition unit, wherein the dead time correction unit estimates reactor voltage from the voltage command, and measured output voltage measured by the output voltage measurement unit, estimates a zero current cross time of the output current and an output current change amount of the output current from the estimated reactor voltage and the measured output current measured by the output current measurement unit, and DC output voltage of the DC power supply, and calculates the dead time correction amount on the basis of the estimated zero current cross time and the estimated output current change amount.

14. The power conversion device according to claim 13, further comprising DC voltage control circuitry for suppressing DC voltage contained in the output voltage, wherein output of the DC voltage control circuitry is added to the voltage command.

15. The power conversion device according to claim 14, wherein the power conversion device is interconnected with a power grid or a distributed power supply, to supply AC power to a load.

16. The power conversion device according to claim 14, wherein the power conversion device supplies AC power to a load independently of a power grid or a distributed power supply.

17. The power conversion device according to claim 13, wherein the power conversion device is interconnected with a power grid or a distributed power supply, to supply AC power to a load.

18. The power conversion device according to claim 13, wherein the power conversion device supplies AC power to a load independently of a power grid or a distributed power supply.

* * * * *